(12) United States Patent
Li et al.

(10) Patent No.: US 9,743,084 B2
(45) Date of Patent: Aug. 22, 2017

(54) IMAGE ENCODING AND DECODING METHOD AND APPARATUS

(71) Applicants: Huawei Technologies Co., Ltd., Shenzhen (CN); Tsinghua University, Beijing (CN)

(72) Inventors: Weiran Li, Beijing (CN); Xiaozhen Zheng, Shenzhen (CN); Yun He, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 4 days.

(21) Appl. No.: 14/979,355

(22) Filed: Dec. 22, 2015

(65) Prior Publication Data

US 2016/0142710 A1 May 19, 2016

Related U.S. Application Data

(63) Continuation of application No. PCT/CN2014/081562, filed on Jul. 3, 2014.

(30) Foreign Application Priority Data

Jul. 19, 2013 (CN) .......................... 2013 1 0306667

(51) Int. Cl.
*G06K 9/46* (2006.01)
*H04N 19/119* (2014.01)
(Continued)

(52) U.S. Cl.
CPC ......... *H04N 19/119* (2014.11); *H04N 19/176* (2014.11); *H04N 19/463* (2014.11)

(58) Field of Classification Search
CPC .. H04N 19/119; H04N 19/117; H04N 19/176; H04N 19/172; H04N 19/174;
(Continued)

(56) References Cited

U.S. PATENT DOCUMENTS 9,270,992 B2 * 2/2016 Shima .................... H04N 19/50
9,386,315 B2 * 7/2016 Lim ...................... H04N 19/174
(Continued)

FOREIGN PATENT DOCUMENTS

CN 102223526 A 10/2011
CN 102595116 A 7/2012
(Continued)

*Primary Examiner* — Ali Bayat
(74) *Attorney, Agent, or Firm* — Leydig, Voit & Mayer, Ltd.

(57) ABSTRACT

Embodiments of the present disclosure provide an image encoding and decoding method and apparatus. A division mode used for a current image block is acquired, division information of the current image block is acquired according to the division mode, and encoding processing is performed on a division mode identifier and the division information that correspond to the division mode, so that a decoder obtains, according to the division mode identifier and the division information, a division template used by an encoder, so as to perform decoding. The encoder and the decoder do not need to store a large quantity of division templates, thereby lightening a burden on an encoding and decoding system.

32 Claims, 8 Drawing Sheets

(51) Int. Cl.
*H04N 19/176* (2014.01)
*H04N 19/463* (2014.01)

(58) Field of Classification Search
CPC .... H04N 19/463; H04N 19/46; G06T 15/005; G06T 15/04; G06T 15/20; G06T 15/30
See application file for complete search history.

(56) References Cited

U.S. PATENT DOCUMENTS

| | | | |
|---|---|---|---|
| 9,414,071 B2* | 8/2016 | Lim | H04N 19/174 |
| 9,521,407 B2* | 12/2016 | Zheng | H04N 19/70 |
| 2013/0034167 A1 | 2/2013 | Zheng | |
| 2013/0301707 A1 | 11/2013 | Lai et al. | |
| 2013/0301716 A1 | 11/2013 | Zheng et al. | |
| 2015/0334394 A1* | 11/2015 | Funakoshi | H04N 19/865 |
| | | | 382/233 |

FOREIGN PATENT DOCUMENTS

| | | |
|---|---|---|
| CN | 102611884 A | 7/2012 |
| CN | 103517070 A | 1/2014 |
| EP | 2621170 A1 | 7/2013 |

* cited by examiner

IMAGE ENCODING AND DECODING METHOD AND APPARATUS

CROSS-REFERENCE TO RELATED APPLICATIONS

This application is a continuation of International Patent Application No. PCT/CN2014/081562, filed on Jul. 3, 2014, which claims priority to Chinese Patent Application No. 201310306667.X, filed on Jul. 19, 2013, both of which are hereby incorporated by reference in their entireties.

TECHNICAL FIELD

Embodiments of the present disclosure relate to image processing technologies, and in particular, to an image encoding and decoding method and apparatus.

BACKGROUND

An image block includes at least one sample point; therefore, there is a plurality of division methods for the image block, each division method is corresponding to one division template, and the division template is used to determine a partition (partition) corresponding to each sample point (sample point) in the image block. By using the division method, an image block may be divided into two partitions in any shape.

The foregoing image block division method may also be applied to an encoding and decoding technology for a depth map of a three-dimensional video; for example, the foregoing image block division method is also used in a wedgelet (Wedgelet) technology. A principle of the wedgelet technology is as follows: After an image block is divided into two partitions in any shape, encoding and decoding operations are performed on each partition by using a predicted value; therefore, only when both an encoder and a decoder use a same division method, the image block can be correctly restored. In the wedgelet technology, different division templates are used for different image block sizes. For example, for a 4×4 image block, there are 86 division templates; for an 8×8 image block, there are 782 division templates. In the prior art, for an image block of a same size, all division templates of the image block are numbered on an encoder and a decoder in a same numbering manner, and the encoder and the decoder store all the division templates. During encoding, the encoder writes a number of a used division template into a bitstream; after acquiring the number of the division template, the decoder acquires, from all of the stored division templates, the division template corresponding to the number of the division template, so as to learn of the division template used by the encoder, thereby correctly restoring the image block.

However, in the method used in the prior art, a large quantity of division templates need to be stored, which occupies more storage space, thereby increasing a burden on an encoding and decoding system.

SUMMARY

Embodiments of the present disclosure provide an image encoding and decoding method and apparatus, so as to lighten a burden on an encoding and decoding system.

A first aspect of an embodiment of the present disclosure provides an image encoding method, including:

acquiring a division mode used for a current image block;

acquiring division information of the current image block according to the division mode; and performing encoding processing on a division mode identifier and the division information that are corresponding to the division mode.

With reference to the first aspect, in a first possible implementation manner, the division mode is a rectangle division mode or a non-rectangle division mode.

With reference to the first possible implementation manner, in a second possible implementation manner, if the division mode is a rectangle division mode, the acquiring division information of the current image block according to the division mode includes:

acquiring a first offset of a division line of the current image block; and the performing encoding processing on a division mode identifier and the division information that are corresponding to the division mode includes:

performing encoding processing on a rectangle division mode identifier and the first offset.

With reference to the first possible implementation manner, in a third possible implementation manner, if the division mode is a non-rectangle division mode, the acquiring division information of the current image block according to the division mode includes:

acquiring a proportion, a division direction, and a second offset that are of a division line of the current image block, where the proportion of the division line is obtained according to coordinate values of two intersection points between the division line and boundaries of the current image block; and the performing encoding processing on a division mode identifier and the division information that are corresponding to the division mode includes:

if the division mode is a non-rectangle division mode, performing encoding processing on a non-rectangle division mode identifier, and the proportion, the division direction, and the second offset that are of the division line.

With reference to the second possible implementation manner, in a fourth possible implementation manner, the first offset is a zero value or a non-zero value;

if the first offset is a non-zero value, the first offset includes a symbol of the first offset and an absolute value of the first offset, and the performing encoding processing on the first offset includes:

successively encoding the absolute value of the first offset and the symbol of the first offset; and if the first offset is a zero value, the first offset has no symbol, and the performing encoding processing on the first offset includes:

encoding the zero value.

With reference to the third possible implementation manner, in a fifth possible implementation manner, the second offset is a zero value or a non-zero value;

if the second offset is a non-zero value, the second offset includes a symbol of the second offset and an absolute value of the second offset, and the performing encoding processing on the second offset includes:

successively encoding the absolute value of the second offset and the symbol of the second offset; and if the second offset is a zero value, the second offset has no symbol bit, and the performing encoding processing on the second offset includes:

encoding the zero value.

With reference to the fourth possible implementation manner, in a sixth possible implementation manner, the successively encoding the absolute value of the first offset and the symbol of the first offset includes:

if the absolute value of the first offset is greater than a preset value, acquiring a first sum of the preset value and a value that is 1/n of a difference between the absolute value of the first offset and the preset value, where n is an integer greater than 1; and successively encoding the first sum and the symbol of the first offset.

With reference to the fifth possible implementation manner, in a seventh possible implementation manner, the successively encoding the absolute value of the second offset and the symbol of the second offset includes:

if the absolute value of the second offset is greater than a preset value, acquiring a second sum of the preset value and a value that is 1/n of a difference between the absolute value of the second offset and the preset value, where n is an integer greater than 1; and successively encoding the second sum and the symbol of the second offset.

With reference to any possible implementation manner of the second to the seventh possible implementation manners, in an eighth possible implementation manner, the proportion of the division line is a ratio of a difference between vertical coordinates to a difference between horizontal coordinates, where the vertical coordinates and the horizontal coordinates are coordinate values of the two intersection points between the division line and the boundaries of the current image block.

A second aspect of an embodiment of the present disclosure provides an image decoding method, including:

acquiring a division mode identifier of a to-be-decoded image block;

acquiring division information of the to-be-decoded image block according to the division mode identifier;

determining, according to the division mode identifier and the division information, a partition to which a sample point in the to-be-decoded image block belongs; and performing decoding processing on the to-be-decoded image block according to the partition to which the sample point belongs.

With reference to the second aspect, in a first possible implementation manner, the division mode identifier is a rectangle division mode identifier or a non-rectangle division mode identifier.

With reference to the first possible implementation manner, in a second possible implementation manner, if the division mode identifier is a rectangle division mode identifier, the acquiring division information of the to-be-decoded image block according to the division mode identifier includes:

acquiring a first offset of a division line of the to-be-decoded image block.

With reference to the first possible implementation manner, in a third possible implementation manner, if the division mode identifier is a non-rectangle division mode identifier, the acquiring division information of the to-be-decoded image block according to the division mode identifier includes:

acquiring a proportion, a division direction, and a second offset that are of a division line of the to-be-decoded image block.

With reference to the second possible implementation manner, in a fourth possible implementation manner, the acquiring a first offset of a division line of the to-be-decoded image block includes:

acquiring the offset value, and if the offset value is a zero value, determining that the first offset is a zero value; and if the offset value is a non-zero value, determining an absolute value of the first offset of the division line according to the offset value, acquiring symbol information of the offset, and determining a symbol of the first offset according to the symbol information.

With reference to the third possible implementation manner, in a fifth possible implementation manner, the acquiring the second offset of the division line of the to-be-decoded image block includes:

acquiring the offset value, and if the offset value is a zero value, determining that the second offset is a zero value; and if the offset value is a non-zero value, determining an absolute value of the second offset of the division line according to the offset value, acquiring symbol information of the offset, and determining a symbol of the second offset according to the symbol information.

With reference to the fourth possible implementation manner, in a sixth possible implementation manner, the determining an absolute value of the first offset of the division line according to the offset value includes:

determining that the offset value is the absolute value of the first offset.

With reference to the fifth possible implementation manner, in a seventh possible implementation manner, the determining an absolute value of the second offset of the division line according to the offset value includes:

determining that the offset value is the absolute value of the second offset.

With reference to the fourth possible implementation manner, in an eighth possible implementation manner, the determining an absolute value of the first offset of the division line according to the offset value includes:

determining whether the offset value is greater than a preset value; if yes, determining that a sum of the preset value and a value that is n multiples of a difference between the offset value and the preset value is the absolute value of the first offset; and if not, determining that the offset value is the absolute value of the first offset, where n is an integer greater than 1.

With reference to the fifth possible implementation manner, in a ninth possible implementation manner, the determining an absolute value of the second offset of the division line according to the offset value includes:

determining whether the offset value is greater than a preset value; if yes, determining that a sum of the preset value and a value that is n multiples of a difference between the offset value and the preset value is the absolute value of the second offset; and if not, determining that the offset value is the absolute value of the second offset, where n is an integer greater than 1.

With reference to any possible implementation manner of the second, the fourth, the sixth, and the eighth possible implementation manners, in a tenth possible implementation manner, the rectangle division mode identifier is a horizontal rectangle division mode identifier or a vertical rectangle division mode identifier.

With reference to the tenth possible implementation manner, in an eleventh possible implementation manner, if the rectangle division mode identifier is a horizontal rectangle division mode identifier, the determining, according to the division mode identifier and the division information, a partition to which a sample point in the to-be-decoded image block belongs includes:

if coordinate values of the sample point meet a condition:

$$y > b1 - a,$$

where y represents a value of a vertical coordinate of the sample point in the to-be-decoded image block, b1 represents a value of a vertical coordinate of a horizontal first preset reference point, and a represents the first offset, determining that the sample point belongs to a first partition; and if the coordinate values of the sample point do not meet the condition y>b1−a, determining that the sample point belongs to a second partition.

With reference to the tenth possible implementation manner, in a twelfth possible implementation manner, if the rectangle division mode identifier is a vertical division mode identifier, the determining, according to the division mode identifier and the division information, a partition to which a sample point in the to-be-decoded image block belongs includes:

if coordinate values of the sample point meet a condition:

$$x > b2 - a,$$

where x represents a value of a horizontal coordinate of the sample point in the to-be-decoded image block, and b2 represents a value of a horizontal coordinate of a vertical first preset reference point, determining that the sample point belongs to a first partition; and if the coordinate values of the sample point do not meet the condition x>b2−a, determining that the sample point belongs to a second partition.

With reference to any possible implementation manner of the third, the fifth, the seventh, and the ninth possible implementation manners, in a thirteenth possible implementation manner, if the division mode identifier is a non-rectangle division mode identifier, the determining, according to the division mode identifier and the division information, a partition to which a sample point in the to-be-decoded image block belongs includes:

determining, according to a relationship between coordinate values of the sample point and the proportion, the division direction, and the second offset that are of the division line, the partition to which the sample point in the to-be-decoded image block belongs.

With reference to the thirteenth possible implementation manner, in a fourteenth possible implementation manner, the division direction is a first direction from upper left to lower right, or a second direction from lower left to upper right.

With reference to the fourteenth possible implementation manner, in a fifteenth possible implementation manner, if the division direction is the first direction from upper left to lower right, the determining, according to a relationship between coordinate values of the sample point and the proportion, the division direction, and the second offset that are of the division line, the partition to which the sample point in the to-be-decoded image block belongs includes:

if the coordinate values of the sample point in the to-be-decoded image block meet the following condition:

$$x - b3 - n \times c < y/r,$$

where (x, y) is the coordinate values of the sample point in the to-be-decoded image block, x represents a value of a horizontal coordinate, y represents a value of a vertical coordinate, b3 represents a value of a horizontal coordinate of a second preset reference point in the first direction, c represents the second offset, r represents the proportion, and n is an integer greater than or equal to 1, determining that the sample point belongs to a first partition; and if the coordinate values of the sample point do not meet the condition x−b4−n×c<y/r, determining that the sample point belongs to a second partition.

With reference to the fourteenth possible implementation manner, in a sixteenth possible implementation manner, if the division direction is the second direction from lower left to upper right, the determining, according to a relationship between coordinate values of the sample point and the proportion, the division direction, and the second offset that are of the division line, the partition to which the sample point in the to-be-decoded image block belongs includes:

if the coordinate values of the sample point in the to-be-decoded image block meet the following condition:

$$b4 - n \times c - x > y/r,$$

where (x, y) is the coordinate values of the sample point in the to-be-decoded image block, x represents a value of a horizontal coordinate, y represents a value of a vertical coordinate, b4 represents a value of a horizontal coordinate of a second preset reference point in the second direction, c represents the second offset, r represents the proportion, and n is an integer greater than or equal to 1; otherwise, n is equal to a reciprocal of the proportion, determining that the sample point belongs to a first partition; and if the coordinate values of the sample point do not meet the condition b4−n×c−x>y/r, determining that the sample point belongs to a second partition.

With reference to the thirteenth possible implementation manner, in a seventeenth possible implementation manner, the proportion is greater than or equal to 1, or the proportion is less than 1.

With reference to the seventeenth possible implementation manner, in an eighteenth possible implementation manner, if the proportion is greater than or equal to 1, the determining, according to a relationship between coordinate values of the sample point and the proportion, the division direction, and the second offset that are of the division line, the partition to which the sample point in the to-be-decoded image block belongs includes:

if the coordinate values of the sample point in the to-be-decoded image block meet the following condition:

$$x - x3 - c > (y - y3)/r,$$

where (x, y) is the coordinate values of the sample point in the to-be-decoded image block, x represents a value of a horizontal coordinate, y represents a value of a vertical coordinate, (x3, y3) represents coordinate values of a second preset reference point, x3 represents a value of a horizontal coordinate, y3 represents a value of a vertical coordinate, c represents the second offset, and r represents the proportion, determining that the sample point belongs to a first partition; and if the coordinate values of the sample point do not meet the condition x−x3−c>(y−y3)/r, determining that the sample point belongs to a second partition.

With reference to the fifteenth or the sixteenth possible implementation manner, in a nineteenth possible implementation manner, when $r=2^s$, y/r is obtained by shifting y rightwards by s bits; and when r=2⁻ˢ, y/r is obtained by shifting y leftwards by s bits, where
s is an integer greater than or equal to 1.
With reference to the eighteenth possible implementation manner, in a twentieth possible implementation manner, when r=2ˢ, (y−y3)/r is obtained by shifting a difference of y−y3 rightwards by s bits; and
when r=2⁻ˢ, (y−y3)/r is obtained by shifting a difference of y−y3 leftwards by s bits, where
s is an integer greater than or equal to 1.
With reference to the seventeenth possible implementation manner, in a twenty-first possible implementation manner, if the proportion is less than 1, the determining, according to a relationship between coordinate values of the sample point and the proportion, the division direction, and the second offset that are of the division line, the partition to which the sample point in the to-be-decoded image block belongs includes:
if the coordinate values of the sample point in the to-be-decoded image block meet the following condition:

y4+c−r(x−x4)>y, where
(x, y) is the coordinate values of the sample point in the to-be-decoded image block, x represents a value of a horizontal coordinate, y represents a value of a vertical coordinate, (x4, y4) represents coordinate values of a second preset reference point, x4 represents a value of a horizontal coordinate, and y4 represents a value of a vertical coordinate, determining that the sample point belongs to a first partition; and if the coordinate values of the sample point do not meet the condition y4+c−r(x−x4)>y, determining that the sample point belongs to a second partition.
With reference to the second aspect, in a twenty-second possible implementation manner, the determining, according to the division mode identifier and the division information, a partition to which a sample point in the to-be-decoded image block belongs includes:
determining, according to the division mode identifier, preset coordinate values of a preset reference point corresponding to an image block size;
determining coordinate values of a preset reference point of the to-be-decoded image block according to a size of the to-be-decoded image block and the preset coordinate values of the preset reference point corresponding to the image block size; and
determining, according to the coordinate values of the preset reference point of the to-be-decoded image block and the division information, the partition to which the sample point in the to-be-decoded image block belongs.
With reference to the second aspect, in a twenty-third possible implementation manner, the determining, according to the division mode identifier and the division information, a partition to which a sample point in the to-be-decoded image block belongs includes:
determining coordinate values of two intersection points between a division line and boundaries of the to-be-decoded image block according to the division mode identifier and the division information; and
determining, according to the coordinate values of the two intersection points and coordinate values of the sample point in the to-be-decoded image block, the partition to which the sample point in the to-be-decoded image block belongs.
With reference to the second aspect or any possible implementation manner of the first to the twenty-third possible implementation manners of the second aspect, in a twenty-fourth possible implementation manner, the performing decoding processing on the to-be-decoded image block according to the partition to which the sample point belongs includes:
determining a division template of the to-be-decoded image block according to the partition to which the sample point belongs; and
performing decoding processing on the to-be-decoded image block according to the division template.
With reference to the twenty-fourth possible implementation manner, in a twenty-fifth possible implementation manner, the performing decoding processing on the to-be-decoded image block according to the division template includes:
if the sample point belongs to a first partition of the division template, performing decoding on the sample point by using a predicted value corresponding to the first partition; and
if the sample point belongs to a second partition of the division template, performing decoding on the sample point by using a predicted value corresponding to the second partition.
A third aspect of an embodiment of the present disclosure provides an image encoding apparatus, including:
a first acquiring module, configured to acquire a division mode used for a current image block;
a second acquiring module, configured to acquire division information of the current image block according to the division mode; and
a processing module, configured to perform encoding processing on a division mode identifier and the division information that are corresponding to the division mode.
With reference to the first aspect, in a first possible implementation manner, the division mode is a rectangle division mode or a non-rectangle division mode.
With reference to the first possible implementation manner, in a second possible implementation manner, if the division mode is a rectangle division mode, the second acquiring module is specifically configured to acquire a first offset of a division line of the current image block; and
the processing module is specifically configured to perform encoding processing on a rectangle division mode identifier and the first offset.
With reference to the first possible implementation manner, in a third possible implementation manner, if the division mode is a non-rectangle division mode, the second acquiring module is specifically configured to acquire a proportion, a division direction, and a second offset that are of a division line of the current image block, where the proportion of the division line is obtained according to coordinate values of two intersection points between the division line and boundaries of the current image block; and
the processing module is specifically configured to: if the division mode is a non-rectangle division mode, perform encoding processing on a non-rectangle division mode identifier, and the proportion, the division direction, and the second offset that are of the division line.
With reference to the second possible implementation manner, in a fourth possible implementation manner, the first offset is a zero value or a non-zero value;
if the first offset is a non-zero value, the first offset includes a symbol of the first offset and an absolute value of the first offset, and
the processing module is specifically configured to successively encode the absolute value of the first offset and the symbol of the first offset; and if the first offset is a zero value, the first offset has no symbol, and the processing module is specifically configured to encode the zero value.

With reference to the third possible implementation manner, in a fifth possible implementation manner, the second offset is a zero value or a non-zero value;

if the second offset is a non-zero value, the second offset includes a symbol of the second offset and an absolute value of the second offset, and the processing module is specifically configured to successively encode the absolute value of the second offset and the symbol of the second offset; and if the second offset is a zero value, the second offset has no symbol bit, and the processing module is specifically configured to encode the zero value.

With reference to the fourth possible implementation manner, in a sixth possible implementation manner, the processing module is specifically configured to: if the absolute value of the first offset is greater than a preset value, acquire a first sum of the preset value and a value that is 1/n of a difference between the absolute value of the first offset and the preset value, where n is an integer greater than 1; and successively encode the first sum and the symbol of the first offset.

With reference to the fifth possible implementation manner, in a seventh possible implementation manner, the processing module is specifically configured to: if the absolute value of the second offset is greater than a preset value, acquire a second sum of the preset value and a value that is 1/n of a difference between the absolute value of the second offset and the preset value, where n is an integer greater than 1; and successively encode the second sum and the symbol of the second offset.

With reference to any possible implementation manner of the second to the seventh possible implementation manners, in an eighth possible implementation manner, the proportion of the division line is a ratio of a difference between vertical coordinates to a difference between horizontal coordinates, where the vertical coordinates and the horizontal coordinates are coordinate values of the two intersection points between the division line and the boundaries of the current image block.

A fourth aspect of an embodiment of the present disclosure provides an image decoding apparatus, including:

a first acquiring module, configured to acquire a division mode identifier of a to-be-decoded image block;

a second acquiring module, configured to acquire division information of the to-be-decoded image block according to the division mode identifier;

a processing module, configured to determine, according to the division mode identifier and the division information, a partition to which a sample point in the to-be-decoded image block belongs; and a decoding module, configured to perform decoding processing on the to-be-decoded image block according to the partition to which the sample point belongs.

With reference to the second aspect, in a first possible implementation manner, the division mode identifier is a rectangle division mode identifier or a non-rectangle division mode identifier.

With reference to the first possible implementation manner, in a second possible implementation manner, if the division mode identifier is a rectangle division mode identifier, the second acquiring module is specifically configured to acquire a first offset of a division line of the to-be-decoded image block.

With reference to the first possible implementation manner, in a third possible implementation manner, if the division mode identifier is a non-rectangle division mode identifier, the second acquiring module is specifically configured to acquire a proportion, a division direction, and a second offset that are of a division line of the to-be-decoded image block.

With reference to the second possible implementation manner, in a fourth possible implementation manner, the second acquiring module is specifically configured to: acquire the offset value; if the offset value is a zero value, determine that the first offset is a zero value; and if the offset value is a non-zero value, determine an absolute value of the first offset of the division line according to the offset value, acquire symbol information of the offset, and determine a symbol of the first offset according to the symbol information.

With reference to the third possible implementation manner, in a fifth possible implementation manner, the second acquiring module is specifically configured to: acquire the offset value; if the offset value is a zero value, determine that the second offset is a zero value; and if the offset value is a non-zero value, determine an absolute value of the second offset of the division line according to the offset value, acquire symbol information of the offset, and determine a symbol of the second offset according to the symbol information.

With reference to the fourth possible implementation manner, in a sixth possible implementation manner, the second acquiring module is specifically configured to determine that the offset value is the absolute value of the first offset.

With reference to the fifth possible implementation manner, in a seventh possible implementation manner, the second acquiring module is specifically configured to determine that the offset value is the absolute value of the second offset.

With reference to the fourth possible implementation manner, in an eighth possible implementation manner, the second acquiring module is specifically configured to: determine whether the offset value is greater than a preset value; if yes, determine that a sum of the preset value and a value that is n multiples of a difference between the offset value and the preset value is the absolute value of the first offset; and if not, determine that the offset value is the absolute value of the first offset, where n is an integer greater than 1.

With reference to the fifth possible implementation manner, in a ninth possible implementation manner, the second acquiring module is specifically configured to: determine whether the offset value is greater than a preset value; if yes, determine that a sum of the preset value and a value that is n multiples of a difference between the offset value and the preset value is the absolute value of the second offset; and if not, determine that the offset value is the absolute value of the second offset, where n is an integer greater than 1.

With reference to any possible implementation manner of the second, the fourth, the sixth, and the eighth possible implementation manners, in a tenth possible implementation manner, the rectangle division mode identifier is a horizontal rectangle division mode identifier or a vertical rectangle division mode identifier.

With reference to the tenth possible implementation manner, in an eleventh possible implementation manner, if the rectangle division mode identifier is a horizontal rectangle division mode identifier, the processing module is specifically configured to: if coordinate values of the sample point meet a condition:

$$y > b1 - a,$$

where y represents a value of a vertical coordinate of the sample point in the to-be-decoded image block, b1 represents a value of a vertical coordinate of a horizontal first preset reference point, and a represents the first offset, determine that the sample point belongs to a first partition; and if the coordinate values of the sample point do not meet the condition y>b1−a, determine that the sample point belongs to a second partition.

With reference to the tenth possible implementation manner, in a twelfth possible implementation manner, if the rectangle division mode identifier is a vertical division mode identifier, the processing module is specifically configured to: if coordinate values of the sample point meet a condition:

$$x > b2 - a,$$

where x represents a value of a horizontal coordinate of the sample point in the to-be-decoded image block, and b2 represents a value of a horizontal coordinate of a vertical first preset reference point, determine that the sample point belongs to a first partition; and if the coordinate values of the sample point do not meet the condition x>b2−a, determine that the sample point belongs to a second partition.

With reference to any possible implementation manner of the third, the fifth, the seventh, and the ninth possible implementation manners, in a thirteenth possible implementation manner, if the division mode identifier is a non-rectangle division mode identifier, the processing module is specifically configured to determine, according to a relationship between coordinate values of the sample point and the proportion, the division direction, and the second offset that are of the division line, the partition to which the sample point in the to-be-decoded image block belongs.

With reference to the thirteenth possible implementation manner, in a fourteenth possible implementation manner, the division direction is a first direction from upper left to lower right, or a second direction from lower left to upper right.

With reference to the fourteenth possible implementation manner, in a fifteenth possible implementation manner, if the division direction is the first direction from upper left to lower right, the processing module is specifically configured to: if the coordinate values of the sample point in the to-be-decoded image block meet the following condition:

$$x - b3 - n \times c < y/r,$$

where (x, y) is the coordinate values of the sample point in the to-be-decoded image block, x represents a value of a horizontal coordinate, y represents a value of a vertical coordinate, b3 represents a value of a horizontal coordinate of a second preset reference point in the first direction, c represents the second offset, r represents the proportion, and n is an integer greater than or equal to 1; otherwise, n is equal to a reciprocal of the proportion, determine that the sample point belongs to a first partition; and if the coordinate values of the sample point do not meet the condition x−b3−c<y/r, determine that the sample point belongs to a second partition.

With reference to the fourteenth possible implementation manner, in a sixteenth possible implementation manner, if the division direction is the second direction from lower left to upper right, the processing module is specifically configured to: if the coordinate values of the sample point in the to-be-decoded image block meet the following condition:

$$b4 - n \times c - x > y/r,$$

where (x, y) is the coordinate values of the sample point in the to-be-decoded image block, x represents a value of a horizontal coordinate, y represents a value of a vertical coordinate, b4 represents a value of a horizontal coordinate of a second preset reference point in the second direction, c represents the second offset, r represents the proportion, and n is an integer greater than or equal to 1; otherwise, n is equal to a reciprocal of the proportion, determine that the sample point belongs to a first partition; and if the coordinate values of the sample point do not meet the condition b4−n×c−x>y/r, determine that the sample point belongs to a second partition.

With reference to the thirteenth possible implementation manner, in a seventeenth possible implementation manner, the proportion is greater than or equal to 1, or the proportion is less than 1.

With reference to the seventeenth possible implementation manner, in an eighteenth possible implementation manner, if the proportion is greater than or equal to 1, the processing module is specifically configured to: if the coordinate values of the sample point in the to-be-decoded image block meet the following condition:

$$x - x3 - c > (y - y3)/r,$$

where (x, y) is the coordinate values of the sample point in the to-be-decoded image block, x represents a value of a horizontal coordinate, y represents a value of a vertical coordinate, (x3, y3) represents coordinate values of a second preset reference point, x3 represents a value of a horizontal coordinate, y3 represents a value of a vertical coordinate, c represents the second offset, and r represents the proportion, determine that the sample point belongs to a first partition; and if the coordinate values of the sample point do not meet the condition x−x3−c>(y−y3)/r, determine that the sample point belongs to a second partition.

With reference to the fifteenth or the sixteenth possible implementation manner, in a nineteenth possible implementation manner, when $r=2^s$, y/r is obtained by shifting y rightwards by s bits; and when $r=2^{-s}$, y/r is obtained by shifting y leftwards by s bits, where s is an integer greater than or equal to 1.

With reference to the eighteenth possible implementation manner, in a twentieth possible implementation manner, when $r=2^s$, (y−y3)/r is obtained by shifting a difference of y−y3 rightwards by s bits; and when $r=2^{-s}$, (y−y3)/r is obtained by shifting a difference of y−y3 leftwards by s bits, where s is an integer greater than or equal to 1.

With reference to the seventeenth possible implementation manner, in a twenty-first possible implementation manner, if the proportion is less than 1, the processing module is specifically configured to: if the coordinate values of the sample point in the to-be-decoded image block meet the following condition:

$$y4 + c - r(x - x4) > y,$$

where (x, y) is the coordinate values of the sample point in the to-be-decoded image block, x represents a value of a horizontal coordinate, y represents a value of a vertical coordinate, (x4, y4) represents coordinate values of a second preset reference point, x4 represents a value of a horizontal coordinate, and y4 represents a value of a vertical coordinate, determine that the sample point belongs to a first partition; and if the coordinate values of the sample point do not meet the condition y4+c−r(x−x4)>y, determine that the sample point belongs to a second partition.

With reference to the fourth aspect, in a twenty-second possible implementation manner, the processing module is specifically configured to: determine, according to the division mode identifier, preset coordinate values of a preset reference point corresponding to an image block size; determine coordinate values of a preset reference point of the to-be-decoded image block according to a size of the to-be-decoded image block and the preset coordinate values of the preset reference point corresponding to the image block size; and determine, according to the coordinate values of the preset reference point of the to-be-decoded image block and the division information, the partition to which the sample point in the to-be-decoded image block belongs.

With reference to the fourth aspect, in a twenty-third possible implementation manner, the processing module is specifically configured to: determine coordinate values of two intersection points between a division line and boundaries of the to-be-decoded image block according to the division mode identifier and the division information; and determine, according to the coordinate values of the two intersection points and coordinate values of the sample point in the to-be-decoded image block, the partition to which the sample point in the to-be-decoded image block belongs.

With reference to the fourth aspect or any possible implementation manner of the first to the twenty-third possible implementation manners of the fourth aspect, in a twenty-fourth possible implementation manner, the decoding module is specifically configured to: determine a division template of the to-be-decoded image block according to the partition to which the sample point belongs; and perform decoding processing on the to-be-decoded image block according to the division template.

With reference to the twenty-fourth possible implementation manner, in a twenty-fifth possible implementation manner, the decoding module is specifically configured to: if the sample point belongs to a first partition of the division template, perform decoding on the sample point by using a predicted value corresponding to the first partition; and if the sample point belongs to a second partition of the division template, perform decoding on the sample point by using a predicted value corresponding to the second partition.

According to the image encoding and decoding methods and apparatuses provided in the embodiments of the present disclosure, a division mode used for a current image block is acquired, division information of the current image block is acquired according to the division mode, and encoding processing is performed on a division mode identifier and the division information that are corresponding to the division mode, so that a decoder obtains, according to the division mode identifier and the division information, a division template used by an encoder, so as to perform decoding. The encoder and the decoder do not need to store a large quantity of division templates, thereby lightening a burden on an encoding and decoding system.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

According to the present disclosure, an encoder performs encoding processing on a division mode identifier and division information that are corresponding to a used division mode, so that a decoder may acquire, according to the division mode identifier and the division information, a division template used by the encoder, so as to perform decoding processing. The encoder and the decoder do not need to store a large quantity of division templates, thereby lightening a burden on an encoding and decoding system.

Figure 1:
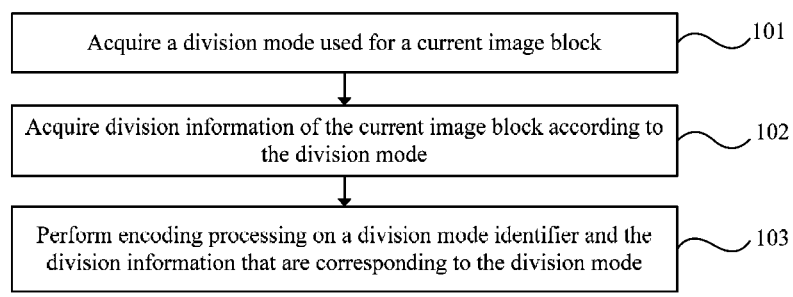
FIG. 1 is a schematic flowchart of Embodiment 1 of an image encoding method according to the present disclosure.

FIG. 1 is a schematic flowchart of Embodiment 1 of an image encoding method according to the present disclosure. The method in this embodiment is executed by an encoder. As shown in FIG. 1, the method in this embodiment includes:

S101: Acquire a division mode used for a current image block.

Figure 2:
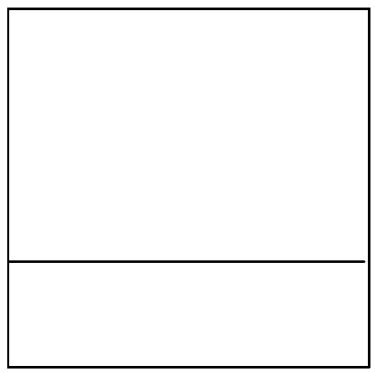
FIG. 2 is a schematic diagram of a rectangle division mode of Embodiment 1 of an image encoding method according to the present disclosure.
Figure 3:
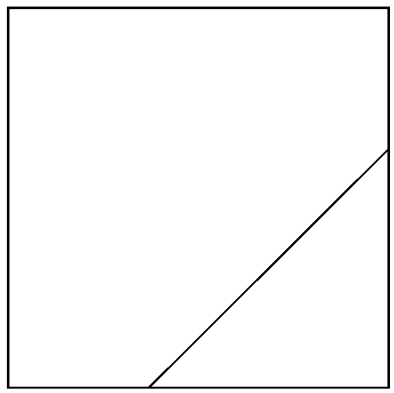
FIG. 3 is a schematic diagram of a non-rectangle division mode of Embodiment 1 of an image encoding method according to the present disclosure.

The division mode includes a rectangle division mode and a non-rectangle division mode. An image block may be divided into two rectangle partitions in a rectangle division mode, as shown in FIG. 2. FIG. 2 is a schematic diagram of a rectangle division mode of Embodiment 1 of an image encoding method according to the present disclosure. Two image blocks may be divided into two non-rectangle partitions in a non-rectangle division mode, as shown in FIG. 3. FIG. 3 is a schematic diagram of a non-rectangle division mode of Embodiment 1 of an image encoding method according to the present disclosure. When encoding is performed on the current image block, the division mode used for the current image block may be determined according to a division template of the current image block, or the division mode used for the current image block may be determined according to whether a division line is parallel with two boundaries of the image block, or the division mode used for the current image block may be determined according to whether a division line is perpendicular to two boundaries of the image block. A manner of specifically acquiring the division mode of the current image block is not limited in the present disclosure. If the current image block is divided into two rectangle partitions, the used division mode is a rectangle division mode, and if the current image block is divided into two non-rectangle partitions, the used division mode is a non-rectangle division mode.

S102: Acquire division information of the current image block according to the division mode.

In different division modes, different division information of the current image block needs to be acquired. The division information may be one or a combination of a first offset, a division direction, a proportion, and a second offset, where the "first" and the "second" in the first offset and the second offset are only used to distinguish an offset in a rectangle division mode from an offset in a non-rectangle division mode, and the first offset and the second offset may be a same parameter.

If the division mode is a rectangle division mode, a first offset of a division line of the current image block is acquired. The division line is a boundary line that divides the current image block into two different partitions. The first offset is an offset of a first intersection point, which is relative to a first preset reference point, between the foregoing division line and a boundary of the current image block, where the first intersection point is a point, which is on a same boundary as the first preset reference point, of two intersection points between the division line and boundaries of the current image block. Setting of the first preset reference point is agreed upon in advance by the encoder and a decoder; therefore, the decoder may learn of coordinate values of the first intersection point of the division line according to the first preset reference point and the first offset, and determine, according to the coordinate values of the first intersection point and the division mode, a partition to which a sample point in a to-be-decoded image block belongs, and further determine a division template of the to-be-decoded image block, so as to perform decoding processing according to the division template.

If the division mode is a non-rectangle division mode, a proportion, a division direction, and a second offset that are of a division line of the current image block are acquired. The proportion, the division direction, and the second offset may form one index value in pairs (for example, the proportion and the division direction, the division direction and the second offset, and the proportion and the second offset), and encoding is performed on the index value; or the proportion, the division direction, and the second offset may form one index value, and encoding is performed on the index value. If there is only one type of proportion in a non-rectangle division mode, it is unnecessary to acquire the proportion of the division line, where the proportion of the division line is obtained according to coordinate values of two intersection points between the division line and boundaries of the current image block. Specifically, the proportion may be a ratio of a difference between vertical coordinates to a difference between horizontal coordinates, where the vertical coordinates and the horizontal coordinates are coordinate values of the two intersection points. If it is assumed that coordinate values of a first intersection point are (x1, y1) and coordinate values of a second intersection point is (x2, y2), the proportion is (y1−y2)/(x1−x2); certainly, the proportion may also be (x1−x2)/(y1−y2). An objective thereof is to determine a tilt angle of the division line by using the proportion, and (y1−y2)/(x1−x2) is used as the proportion in the embodiment of the present disclosure. The division direction refers to a direction of the division line and is a first direction from upper left to lower right, or a second direction from lower left to upper right. The second offset is an offset of a second intersection point, which is relative to a second preset reference point, between the division line and a boundary of the current image block, where the second intersection point is a point, which is on a same boundary as the second preset reference point, of two intersection points between the division line and boundaries of the current image block. Setting of the second preset reference point is agreed upon in advance by the encoder and a decoder; therefore, the decoder may determine, according to the second preset reference point, the second offset, the proportion, and the division direction, a partition to which a sample point in a to-be-decoded image block belongs, and further determine a division template of the to-be-decoded image block, so as to perform decoding processing according to the division template.

S103: Perform encoding processing on a division mode identifier and the division information that are corresponding to the division mode.

The division mode identifier includes a rectangle division mode identifier and a non-rectangle mode identifier; if the division mode is a rectangle division mode, a corresponding division mode identifier is a rectangle division mode identifier; and if the division mode is a non-rectangle division mode, a corresponding division mode identifier is a non-rectangle division mode identifier. The rectangle mode identifier and the non-rectangle mode identifier are corresponding to different code words. For example, "0" may be used to represent the rectangle division mode, and "1" may be used to represent the non-rectangle division mode. The rectangle division mode is further classified into a horizontal rectangle division mode and a vertical rectangle division mode. Therefore, one bit may be added to a location following the rectangle division mode identifier to specifically identify whether the rectangle division mode is a horizontal rectangle division mode or a vertical rectangle division mode; for example, "01" may be used to represent the horizontal division rectangle division mode, and "00" may be used to represent the vertical rectangle division mode. When acquiring the division mode identifier, if learning that a first bit is "1", the decoder determines that the encoder uses a non-rectangle division mode; and if learning that the first bit is "0", the decoder learns that the encoder uses a rectangle division mode, and further acquires a next bit. If the next bit is "1", the decoder determines that the encoder uses a horizontal rectangle division mode in the rectangle division mode; and if the next bit is "0", the decoder determines that the encoder uses a vertical rectangle division mode in the rectangle division mode. The foregoing descriptions are only exemplary; for a code word specifically used to identify a rectangle division mode, a non-rectangle division mode, a horizontal rectangle division mode, or a vertical rectangle division mode, the present disclosure sets no limitation, so long as a code word agreed upon by the encoder and the decoder represents same meaning. For example, in the encoder, it is specified that "0" represents a rectangle division mode, and "1" represents a non-rectangle division mode; in the decoder, it is also specified that "0" represents a rectangle division mode, and "1" represents a non-rectangle division mode. In an encoding and decoding system, a same parameter may be used to represent the foregoing rectangle mode identifier, non-rectangle mode identifier, vertical rectangle division mode, and horizontal rectangle division mode. According to the foregoing examples, in the encoder, different division modes are corresponding to different code words, and the decoder determines a corresponding division mode according to a code word obtained by means of decoding.

If the division mode is a rectangle division mode, encoding processing needs to be performed on the rectangle division mode identifier and the first offset; and if the division mode is a non-rectangle division mode, encoding processing needs to be performed on the non-rectangle division mode identifier, and the proportion, the division direction, and the second offset that are of the division line.

In this step, performing encoding processing on the first offset includes but is not limited to the following several feasible implementation manners:

In a first feasible implementation manner, when the first offset is a zero value, the zero value is directly encoded. When the first offset is a non-zero value, the first offset includes a symbol and an absolute value of the first offset, and the absolute value of the first offset and the symbol of the first offset are successively encoded. For example, if the first offset is −8, 8 is first encoded and then the symbol of −8 is encoded, where the symbol includes two types, that is, a positive sign and a negative sign; therefore, a symbol may be encoded by using 1 bit. During decoding, the decoder first determines whether an offset value is a zero value or a non-zero value; if the offset value is a non-zero value, the decoder needs to further acquire symbol information, so as to correctly restore the first offset.

In a second feasible implementation manner, when the first offset is relatively large, the current image block is divided into two partitions whose sizes have a relatively great difference. However, in an actual application, there is a relatively small probability that the current image block is divided into two partitions whose sizes have a relatively great difference; therefore, to reduce encoding bits and save resources, when an absolute value of the first offset is greater than a preset value, encoding is performed on a symbol of the first offset and a first sum of the preset value and a value that is 1/n of a difference between the absolute value of the first offset and the preset value, where n is an integer greater than 1. A value range of the first sum is smaller than a value range of the first offset; therefore, encoding bits can be reduced, thereby saving resources.

In this step, performing encoding processing on the second offset includes but is not limited to the following several feasible implementation manners:

In a first feasible implementation manner, when the second offset is a zero value, the zero value is directly encoded. When the second offset is a non-zero value, the second offset includes a symbol and an absolute value of the second offset, and the absolute value of the second offset and the symbol of the second offset are successively encoded.

In a second feasible implementation manner, when the second offset is relatively large, the current image block is divided into two partitions whose sizes have a relatively great difference. However, in an actual application, there is a relatively small probability that the current image block is divided into two partitions whose sizes have a relatively great difference; therefore, to reduce encoding bits and save resources, when an absolute value of the second offset is greater than a preset value, encoding is performed on a symbol bit of the second offset and a second sum of the preset value and a value that is 1/n of a difference between the absolute value of the second offset and the preset value. A value range of the second sum is smaller than a value range of the second offset; therefore, encoding bits can be reduced, thereby saving resources.

In this step, an implementation manner of performing encoding processing on the second offset is similar to an implementation manner of performing encoding processing on the first offset, and details are not described herein again.

According to the image encoding and decoding method and apparatus provided in this embodiment of the present disclosure, a division mode used for a current image block is acquired, division information of the current image block is acquired according to the division mode, and encoding processing is performed on a division mode identifier and the division information that are corresponding to the division mode, so that a decoder obtains, according to the division mode identifier and the division information, a division template used by an encoder, so as to perform decoding. The encoder and the decoder do not need to store a large quantity of division templates, thereby lightening a burden on an encoding and decoding system.

Figure 4:
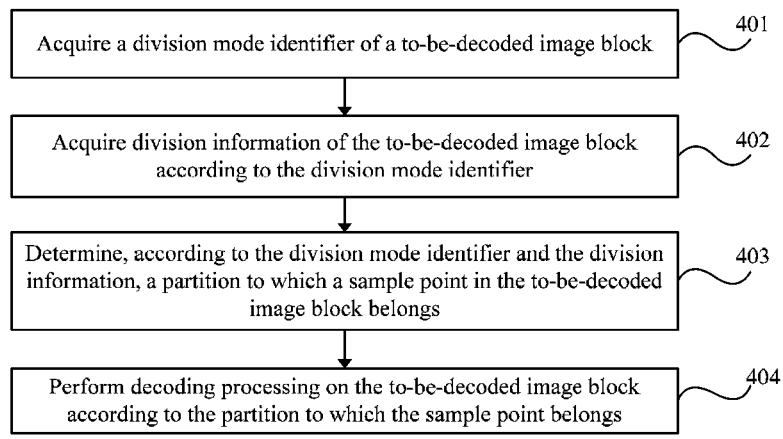
FIG. 4 is a schematic flowchart of Embodiment 1 of an image decoding method according to the present disclosure.

FIG. 4 is a schematic flowchart of Embodiment 1 of an image decoding method according to the present disclosure. The method in this embodiment is executed by a decoder. As shown in FIG. 4, the method in this embodiment includes:

S401: Acquire a division mode identifier of a to-be-decoded image block.

The division mode identifier is a rectangle division mode identifier or a non-rectangle division mode identifier, and the decoder acquires the division mode identifier according to a correspondence that is between a code word and a division mode and is agreed upon by the decoder and an encoder.

S402: Acquire division information of the to-be-decoded image block according to the division mode identifier.

If the division mode identifier is a rectangle division mode identifier, a first offset of a division line of the to-be-decoded image block is acquired; or if the division mode identifier is a non-rectangle division mode identifier, a proportion, a division direction, and a second offset that are of a division line of the to-be-decoded image block are acquired. Alternatively, an index value may be acquired; a proportion and a division direction, or a division direction and a second offset, or a proportion and a second offset, or a proportion, a division direction, and a second offset are acquired by means of table lookup or in a preset manner.

If the division mode identifier is a rectangle division mode identifier, and if an offset value in a bitstream is a zero value, it is determined that the first offset is a zero value; and if the offset value is a non-zero value, an absolute value of the first offset of the division line is determined according to the offset value, symbol information of the offset is then acquired, and a symbol of the first offset is determined according to the symbol information.

The offset value may be the absolute value of the first offset, or may be a logarithm value of the absolute value of the first offset, or may be a first sum of a preset value and a value that is 1/n of a difference between the absolute value of the first offset and the preset value, where n is an integer greater than 1.

Specifically, determining the absolute value of the first offset of the division line according to the offset value includes but is not limited to the following several manners:

If the encoder performs encoding on the first offset in the first feasible implementation manner in S103, the decoder acquires the offset value, determines that the foregoing offset value is the absolute value of the first offset, acquires the symbol information, and determines the symbol of the first offset.

If the encoder performs encoding on the first offset in the second feasible implementation manner in S103, the decoder acquires the offset value, and determines whether the offset value is greater than the preset value; if yes, determines that a sum of the preset value and a value that is n multiples of a difference between the offset value and the preset value is the absolute value of the first offset, where n is an integer greater than 1; and if not, determines that the offset value is the absolute value of the first offset.

If the division mode identifier is a non-rectangle division mode identifier, and if an offset value in a bitstream is a zero value, it is determined that the second offset is a zero value; and if the offset value is a non-zero value, an absolute value of the second offset of the division line is determined according to the offset value, symbol information of the offset is acquired, and a symbol of the second offset is determined according to the symbol information.

The offset value may be the absolute value of the second offset, or may be a logarithm value of the absolute value of the second offset, or may be a second sum of a preset value and a value that is 1/n of a difference between the absolute value of the second offset and the preset value.

Specifically, determining the absolute value of the second offset of the division line according to the offset value includes but is not limited to the following several manners:

If the encoder performs encoding on the second offset in the first feasible implementation manner in S103, the decoder acquires the offset value, determines that the foregoing offset value is the absolute value of the second offset, acquires the symbol information, and determines the symbol of the second offset according to the symbol information.

If the encoder performs encoding on the second offset in the second feasible implementation manner in S103, the decoder acquires the offset value, and determines whether the offset value is greater than the preset value; if yes, determines that a sum of the preset value and a value that is n multiples of a difference between the offset value and the preset value is the absolute value of the second offset, where n is an integer greater than 1; and if not, determines that the offset value is the absolute value of the second offset.

S403: Determine, according to the division mode identifier and the division information, a partition to which a sample point in the to-be-decoded image block belongs.

The rectangle division mode identifier is classified into a horizontal rectangle division mode identifier and a vertical rectangle division mode identifier.

If the rectangle division mode identifier is a horizontal rectangle division mode identifier, the partition to which the sample point in the to-be-decoded image block belongs is determined according to a condition y>b1−a, where y represents a value of a vertical coordinate of the sample point in the to-be-decoded image block, b1 represents a value of a vertical coordinate of a horizontal first preset reference point, and a represents the first offset. If coordinate values of the sample point meet the condition y>b1−a, it is determined that the sample point belongs to a first partition; and if the coordinate values of the sample point do not meet the condition y>b1−a, it is determined that the sample point belongs to a second partition, that is, it is determined that the sample point on the division line belongs to the second partition. It may be understood that it may also be determined that the sample point on the division line belongs to the first partition, which is determined according to a specific case.

If the rectangle division mode identifier is a vertical rectangle division mode identifier, the partition to which the sample point in the to-be-decoded image block belongs is determined according to a condition x>b2−a, where x represents a value of a horizontal coordinate of the sample point in the to-be-decoded image block, and b2 represents a value of a horizontal coordinate of a vertical first preset reference point, and a represents the first offset. If coordinate values of the sample point meet the condition x>b2−a, it is determined that the sample point belongs to a first partition; and if the coordinate values of the sample point do not meet the condition x>b2−a, it is determined that the sample point belongs to a second partition, that is, it is determined that the sample point on the division line belongs to the second partition. It may be understood that it may also be determined that the sample point on the division line belongs to the first partition, which is determined according to a specific case.

If the division mode identifier is a non-rectangle division mode identifier, the division information includes the proportion, the division direction, and the second offset. An implementation manner of determining, according to a relationship between coordinate values of the sample point and the proportion, the division direction, and the second offset that are of the division line, the partition to which the sample point in the to-be-decoded image block belongs is as follows:

The second offset is an offset of a second intersection point, which is relative to a second preset reference point, between the division line and a horizontal boundary or boundary extension line of the to-be-decoded image block, or an offset of a second intersection point, which is relative to a second preset reference point, between the division line and a vertical boundary or boundary extension line of a current image block, where the second preset reference point and the second intersection point are on a same boundary. The division direction of the division line is a first direction from upper left to lower right, or a second direction from lower left to upper right.

When the division direction is the first direction from upper left to lower right, the partition to which the sample point in the to-be-decoded image block belongs is determined according to a condition $x-b3-n\times c<y/r$, where $(x, y)$ is the coordinate values of the sample point in the to-be-decoded image block, x represents a value of a horizontal coordinate, y represents a value of a vertical coordinate, b3 represents a value of a horizontal coordinate of a second preset reference point in the first direction, c represents the second offset, r represents the proportion, and n is an integer greater than or equal to 1. If the coordinate values of the sample point meet the condition $x-b3-n\times c<y/r$, it is determined that the sample point belongs to a first partition; and if the coordinate values of the sample point do not meet the condition $x-b3-n\times c<y/r$, it is determined that the sample point belongs to a second partition, that is, it is determined that the sample point on the division line belongs to the second partition. It may be understood that it may also be determined that the sample point on the division line belongs to the first partition, which is determined according to a specific case.

When the division direction is the second direction from lower left to upper right, the partition to which the sample point in the to-be-decoded image block belongs is determined according to a condition $b4-n\times c-x>y/r$, where $(x, y)$ is the coordinate values of the sample point in the to-be-decoded image block, x represents a value of a horizontal coordinate, y represents a value of a vertical coordinate, b4 represents a value of a horizontal coordinate of a second preset reference point in the second direction, c represents the second offset, r represents the proportion, and n is an integer greater than or equal to 1. If the coordinate values of the sample point meet the condition $b4-n\times c-x>y/r$, it is determined that the sample point belongs to a first partition; and if the coordinate values of the sample point do not meet the condition $b4-n\times c-x>y/r$, it is determined that the sample point belongs to a second partition, that is, it is determined that the sample point on the division line belongs to the second partition. It may be understood that it may also be determined that the sample point on the division line belongs to the first partition, which is determined according to a specific case.

In the foregoing embodiment, a value of n may be a preset value, or may be determined according to the proportion. When the proportion is greater than or equal to 1, the value of n is 1; otherwise, n is equal to a reciprocal of the proportion.

Another implementation manner of determining, according to a relationship between coordinate values of the sample point and the proportion, the division direction, and the second offset that are of the division line, the partition to which the sample point in the to-be-decoded image block belongs is as follows:

When the proportion is greater than or equal to 1, the second offset is an offset of a second intersection point, which is relative to a second preset reference point, between the division line and a horizontal boundary of the to-be-decoded image block, where the second preset reference point and the second intersection point are on the same horizontal boundary. If the coordinate values of the sample point in the to-be-decoded image block meet the following condition:

$$x-x3-c>(y-y3)/r,$$

where (x, y) is the coordinate values of the sample point in the to-be-decoded image block, x represents a value of a horizontal coordinate, y represents a value of a vertical coordinate, (x3, y3) represents coordinate values of the second preset reference point, x3 represents a value of a horizontal coordinate, y3 represents a value of a vertical coordinate, c represents the second offset, and r represents the proportion, it is determined that the sample point belongs to a first partition; and if the coordinate values of the sample point do not meet the condition $x-x3-c>(y-y3)/r$, it is determined that the sample point belongs to a second partition, that is, it is determined that the sample point on the division line belongs to the second partition. It may be understood that it may also be determined that the sample point on the division line belongs to the first partition, which is determined according to a specific case.

When the proportion is less than 1, the second offset is an offset of a second intersection point, which is relative to a second preset reference point, between the division line and a vertical boundary of a current image block, where the second preset reference point and the second intersection point are on the same vertical boundary. If the coordinate values of the sample point in the to-be-decoded image block meet the following condition:

$$y4+c-r(x-x4)>y,$$

where (x, y) is the coordinate values of the sample point in the to-be-decoded image block, x represents a value of a horizontal coordinate, y represents a value of a vertical coordinate, (x4, y4) represents coordinate values of the second preset reference point, x4 represents a value of a horizontal coordinate, y4 represents a value of a vertical coordinate, c represents the second offset, and r represents the proportion, it is determined that the sample point belongs to a first partition; and if the coordinate values of the sample point do not meet the condition $y4+c-r(x-x4)>y$, it is determined that the sample point belongs to a second partition, that is, it is determined that the sample point on the division line belongs to the second partition. It may be understood that it may also be determined that the sample point on the division line belongs to the first partition, which is determined according to a specific case.

A division operation involved in the foregoing embodiment may be obtained by means of a shift operation. For example, when $r=2^s$, y/r may be obtained by shifting y rightwards by s bits; and when $r=2^{-s}$, y/r may be obtained by shifting y leftwards by s bits, where s is an integer greater than or equal to 1. When $r=2^s$, $(y-y3)/r$ may be obtained by shifting a difference of $y-y3$ rightwards by s bits; and when $r=2^{-s}$, $(y-y3)/r$ may be obtained by shifting a difference of $y-y3$ leftwards by s bits, where s is an integer greater than or equal to 1.

Another implementation manner of determining, according to the division mode identifier and the division information, a partition to which a sample point in the to-be-decoded image block belongs is as follows:

Preset coordinate values of a preset reference point corresponding to an image block size are determined according to the division mode identifier; coordinate values of a preset reference point of the to-be-decoded image block are determined according to a size of the to-be-decoded image block and the preset coordinate values of the preset reference point corresponding to the image block size; and the partition to which the sample point in the to-be-decoded image block belongs is determined according to the coordinate values of the preset reference point of the to-be-decoded image block and the division information.

More specifically, descriptions are given from the perspective of a non-rectangle division mode, after the coordinate values of the preset reference point of the to-be-decoded image block are determined, coordinate values of one intersection point between the division line and a boundary of the to-be-decoded image block may be determined according to the coordinate values of the preset reference point and the second offset, and the division line that passes through the intersection point is then determined according to the proportion and the division direction, so as to obtain coordinate values of the other intersection point between the division line and a boundary of the to-be-decoded image block, where the two intersection points are respectively referred to as a third intersection point and a fourth intersection point. After the coordinate values of the two intersection points are determined, if the division direction is the first direction from upper left to lower right, the partition to which the sample point in the to-be-decoded image block belongs is determined according to a condition $(y-y1)/(x1-x)>(y2-y)/(x-x2)$, where $(x, y)$ is coordinate values of the sample point in the to-be-decoded image block, x represents a value of a horizontal coordinate, y represents a value of a vertical coordinate, $(x1, y1)$ represents the coordinate values of the third intersection point, and $(x2, y2)$ represents the coordinate values of the fourth intersection point. If the coordinate values of the sample point meet the condition $(y-y1)/(x1-x)>(y2-y)/(x-x2)$, it is determined that the sample point belongs to a first partition; and if the coordinate values of the sample point do not meet the condition $(y-y1)/(x1-x)>(y2-y)/(x-x2)$, it is determined that the sample point belongs to a second partition, that is, it is determined that the sample point on the division line belongs to the second partition. It may be understood that it may also be determined that the sample point on the division line belongs to the first partition, which is determined according to a specific case.

If the division direction is the second direction from lower left to upper right, the partition to which the sample point in the to-be-decoded image block belongs is determined according to a condition $(y-y1)/(x1-x)>(y2-y)/(x-x2)$, where $(x, y)$ is coordinate values of the sample point in the to-be-decoded image block, x represents a value of a horizontal coordinate, y represents a value of a vertical coordinate, $(x1, y1)$ represents the coordinate values of the third intersection point, and $(x2, y2)$ represents the coordinate values of the fourth intersection point. If the coordinate values of the sample point meet the condition $(y-y1)/(x1-x)>(y2-y)/(x-x2)$, it is determined that the sample point belongs to a first partition; and if the coordinate values of the sample point do not meet the condition $(y-y1)/(x1-x)>(y2-y)/(x-x2)$, it is determined that the sample point belongs to a second partition, that is, it is determined that the sample point on the division line belongs to the second partition. It may be understood that it may also be determined that the sample point on the division line belongs to the first partition, which is determined according to a specific case.

Figure 10:
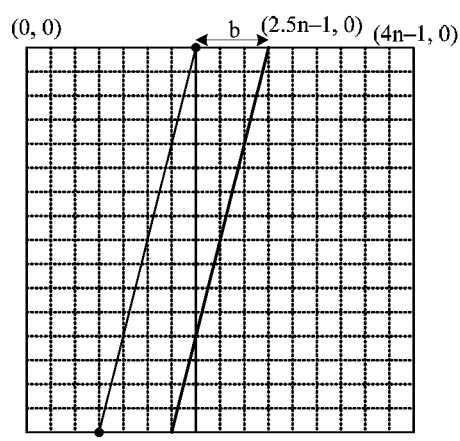
FIG. 10 is a schematic diagram of a 4:1 second preset reference point of Embodiment 1 of an image encoding method according to the present disclosure.

Still another implementation manner of determining, according to the division mode identifier and the division information, a partition to which a sample point in the to-be-decoded image block belongs is as follows:

When the partition to which the sample point in the image block belongs is being determined, shapes of division templates corresponding to a same proportion and division direction are the same, and only locations of division lines are different. Therefore, a base pattern may be determined after the proportion and the division direction of the division line of the image block are determined, and an intersection point between a division line of the base pattern and a boundary of the image block is a reference point. An offset value may be used to determine a division template of the image block. As shown in FIG. 10, it may be considered that a division template of an image block is obtained by shifting a base pattern leftwards by b sample points.

Therefore, in an encoding and decoding system, a base pattern of an image block may be determined according to a division mode, a proportion, and a division direction that are of the image block, and a partition to which a sample point in the image block belongs is determined according to an offset value and coordinate values of the sample point in the image block. It is assumed that a size of the image block is 4n×4n, the offset value is b, coordinate values of the sample point in the image block are $(x, y)$, and the base pattern is basePattern, where basePattern is an array. A value 0 or 1 is obtained from the base pattern according to the coordinate values $(x, y)$, where the value 0 or 1 indicates that the sample point belongs to a partition 0 or a partition 1. A method for determining the partition to which the sample point in the image block belongs is as follows:

If a value of x−b is less than 0, the sample point belongs to the partition 0;

otherwise, if the value of x−b is greater than 4n−1, the sample point belongs to the partition 1;

otherwise, if a value of basePattern[x−b] is equal to 0, the sample point belongs to the partition 0;

otherwise, if the value of basePattern[x−b] is equal to 1, the sample point belongs to the partition 1.

It can be learned according to the foregoing example, that a horizontal coordinate of the sample point in the image block is changed according to the offset value b, and the partition to which the sample point in the image block belongs is determined according to the base pattern and coordinate values obtained after the coordinate change.

According to the foregoing example, a coordinate change may be made on a vertical coordinate or a combination of the horizontal coordinate and the vertical coordinate of the sample point in the image block according to the offset value, and the partition to which the sample point in the image block belongs is determined according to the base pattern and coordinate values obtained after the coordinate change.

S404: Perform decoding processing on the to-be-decoded image block according to the partition to which the sample point belongs.

In step S403, after the partition to which the sample point belongs is determined, a division template of the to-be-decoded image block is determined according to the partition to which the sample point belongs, and decoding processing is performed on the to-be-decoded image block according to the division template.

That a decoding processing module for pixel restoring performs decoding processing on the to-be-decoded image block according to the division template includes the following: If the sample point belongs to a first partition of the division template, decoding is performed on the sample point by using a predicted value corresponding to the first partition; and if the sample point belongs to a second partition of the division template, decoding is performed on the sample point by using a predicted value corresponding to the second partition.

All other decoding processing modules can perform decoding processing on the to-be-decoded image block according to the division template.

In this embodiment, a division mode identifier of a to-be-decoded image block is acquired, division information of the to-be-decoded image block is acquired according to the division mode identifier, a partition to which a sample point in the to-be-decoded image block belongs is determined according to the division mode identifier and the division information, decoding processing is performed on the to-be-decoded image block according to the partition to which the sample point belongs, and an encoder and a decoder do not need to store a large quantity of division templates, thereby lightening a burden on an encoding and decoding system.

In the foregoing embodiments, the encoder and the decoder use same rules to determine the first preset reference point or the second preset reference point, and one rule thereof is illustrated by using examples.

If the division mode used by the encoder is a horizontal rectangle division mode, it is determined that the first preset reference point is a center point of a left boundary of a current image block; and the decoder determines, according to the horizontal rectangle division mode identifier, that a center point of a left boundary of the to-be-decoded image block is the first preset reference point.

If the division mode used by the encoder is a vertical rectangle division mode, it is determined that the first preset reference point is a center point of an upper boundary of a current image block; and the decoder determines, according to the vertical division mode identifier, that a center point of an upper boundary of the to-be-decoded image block is the second preset reference point.

If the division mode used by the encoder is a non-rectangle division mode, the proportion and the division direction of the division line are the same, and an intersection point between a line and a left boundary or an upper boundary of a current image block is used as the second preset reference point, where the line divides the current image block into two partitions of a same size. The decoder determines, according to the proportion and the division direction of the division line, the division mode used by the encoder, the proportion and the division direction of the division line are the same, and an intersection point between a line and a left boundary or an upper boundary of the to-be-decoded image block is used as the second preset reference point, where the line divides the to-be-decoded image block into two partitions of a same size.

Figure 5:
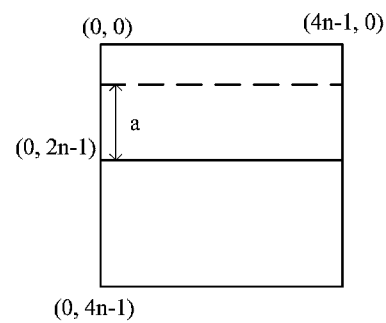
FIG. 5 is a schematic diagram of a horizontal first preset reference point of Embodiment 1 of an image encoding method according to the present disclosure.
Figure 6:
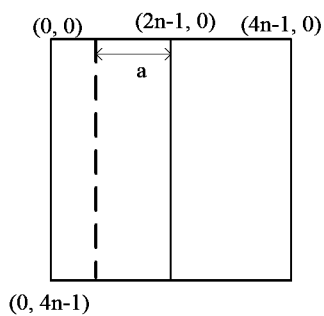
FIG. 6 is a schematic diagram of a vertical first preset reference point of Embodiment 1 of an image encoding method according to the present disclosure.
Figure 7:
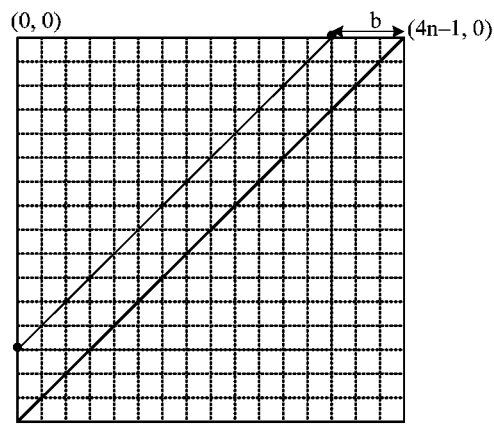
FIG. 7 is a schematic diagram of a second preset reference point in a 1:1 division mode of Embodiment 1 of an image encoding method according to the present disclosure.
Figure 8:
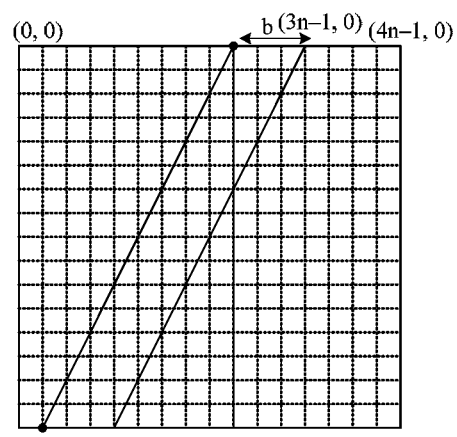
FIG. 8 is a schematic diagram of a 2:1 second preset reference point of Embodiment 1 of an image encoding method according to the present disclosure.
Figure 9:
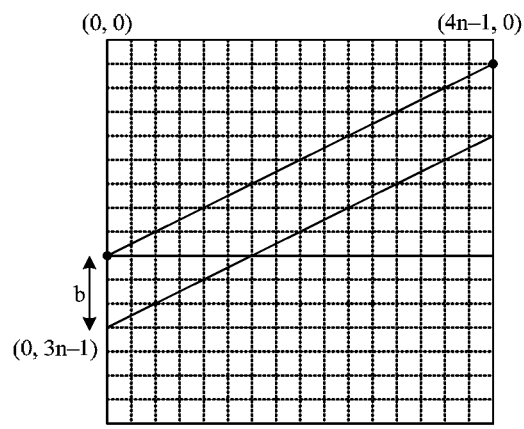
FIG. 9 is a schematic diagram of a 1:2 second preset reference point of Embodiment 1 of an image encoding method according to the present disclosure.
Figure 11:
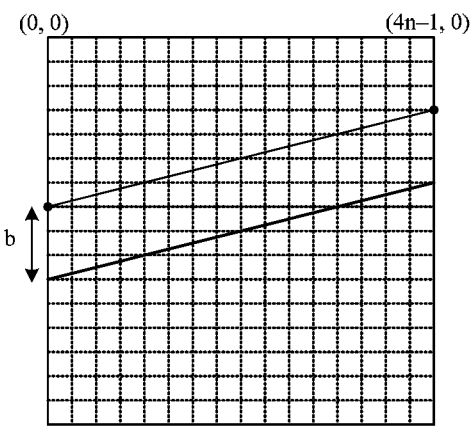
FIG. 11 is a schematic diagram of a 1:4 second preset reference point of Embodiment 1 of an image encoding method according to the present disclosure.

To more clearly describe the first preset reference point and the second preset reference point determined by using the foregoing methods, the present disclosure further provides a diagrammatic presentation of the first preset reference point determined in a horizontal rectangle division mode, a diagrammatic presentation of the first preset reference point determined in a vertical rectangle division mode, and a diagrammatic presentation of the second reference point determined in a non-rectangle division mode, where proportions in the non-rectangle division mode respectively are 1:1, 2:1, 1:2, 4:1, and 1:4. FIG. 5 is a schematic diagram of a horizontal first preset reference point of Embodiment 1 of an image encoding method according to the present disclosure, where a size of a current image block is 4n×4n, and (0, 2n−1) is a determined first preset reference point. FIG. 6 is a schematic diagram of a vertical first preset reference point of Embodiment 1 of an image encoding method according to the present disclosure, where a size of a current image block is 4n×4n, and (2n−1, 0) is a determined first preset reference point. FIG. 7 is a schematic diagram of a 1:1 second preset reference point of Embodiment 1 of an image encoding method according to the present disclosure, where a size of a current image block is 4n×4n, a proportion is 1:1, a division direction is from lower left to upper right, b represents an offset value, and (4n−1, 0) is a determined second preset reference point. FIG. 8 is a schematic diagram of a 2:1 second preset reference point of Embodiment 1 of an image encoding method according to the present disclosure, where a size of a current image block is 4n×4n, a proportion is 2:1, a division direction is from lower left to upper right, b represents an offset value, and (3n−1, 0) is a determined second preset reference point. FIG. 9 is a schematic diagram of a 1:2 second preset reference point of Embodiment 1 of an image encoding method according to the present disclosure, where a size of a current image block is 4n×4n, a proportion is 1:2, a division direction is from lower left to upper right, b represents an offset value, and (0, 3n−1) is a determined second preset reference point. FIG. 10 is a schematic diagram of a 4:1 second preset reference point of Embodiment 1 of an image encoding method according to the present disclosure, where a size of a current image block is 4n×4n, a proportion is 4:1, a division direction is from lower left to upper right, b represents an offset value, and (2.5n−1, 0) is a determined second preset reference point. FIG. 11 is a schematic diagram of a 1:4 second preset reference point of Embodiment 1 of an image encoding method according to the present disclosure, where a size of a current image block is 4n×4n, a proportion is 1:4, a division direction is from lower left to upper right, b represents an offset value, and (0, 2.5n−1) is a determined second preset reference point.

In a division mode determining process, after a proportion and a division direction are determined, a division line always shifts relatively to a reference point in a horizontal direction or a vertical direction; therefore, the reference point may be represented as a value of a horizontal coordinate or a vertical coordinate of the reference point in a condition of a corresponding proportion and division direction. For example, as shown in FIG. 10, in this case, the proportion is 4:1, the division direction is from lower left to upper right, a division line of the image block shifts relatively to the reference point in a horizontal direction, and the reference point may be represented as 2.5n−1.

Figure 12:
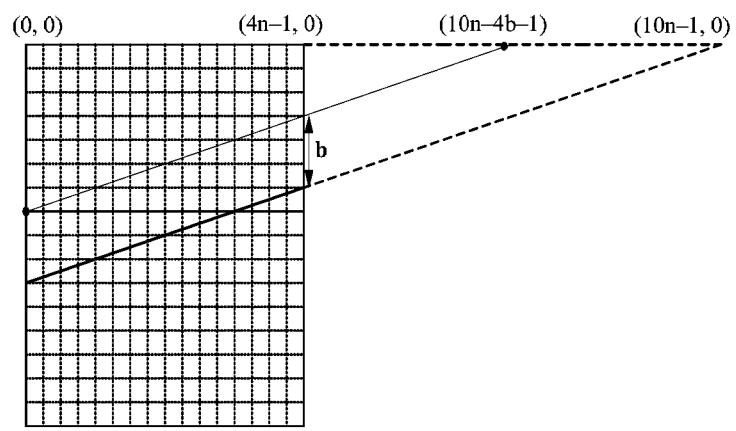
FIG. 12 is a schematic diagram of a 1:4 second preset reference point of Embodiment 1 of an image encoding method according to the present disclosure.
Figure 13:
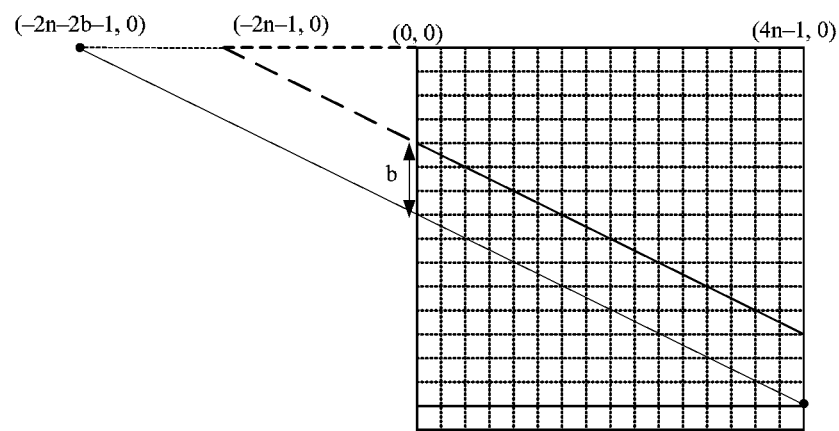
FIG. 13 is a schematic diagram of a 1:2 second preset reference point of Embodiment 1 of an image encoding method according to the present disclosure.

When the proportion is less than 1, a second offset is an offset of a second intersection point, which is relative to a second preset reference point, between the division line and a horizontal boundary extension line of a current image block, where the second preset reference point and the second intersection point are on a same horizontal boundary. A division direction of the division line is a first direction from upper left to lower right, or a second direction from lower left to upper right. Using 1:4 and 1:2 as examples, FIG. 12 is a schematic diagram of a 1:4 second preset reference point of Embodiment 1 of an image encoding method according to the present disclosure, where a size of a current image block is 4n×4n, a proportion is 1:4, a division direction is from lower left to upper right, b represents an offset value, (10n−1, 0) is a determined second preset reference point, and coordinates of a second intersection point are (10n−4b−1, 0). FIG. 13 is a schematic diagram of a 1:2 second preset reference point of Embodiment 1 of an image encoding method according to the present disclosure, where a size of a current image block is 4n×4n, a proportion is 1:2, a division direction is from lower left to upper right, b represents an offset value, (−2n−1, 0) is a determined second preset reference point, and coordinates of a second intersection point are (−2n−2b−1, 0).

Figure 14:
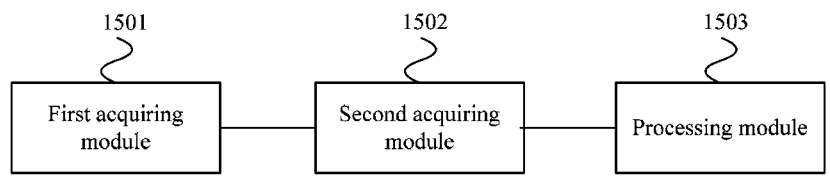
FIG. 14 is a schematic structural diagram of Embodiment 1 of an image encoding apparatus according to the present disclosure.

FIG. 14 is a schematic structural diagram of Embodiment 1 of an image encoding apparatus according to the present disclosure. The apparatus in this embodiment includes: a first acquiring module 1501, a second acquiring module 1502, and a processing module 1503, where the first acquiring module 1501 is configured to acquire a division mode used for a current image block, the second acquiring module 1202 is configured to acquire division information of the current image block according to the division mode, and the processing module 1503 is configured to perform encoding processing on a division mode identifier and the division information that are corresponding to the division mode.

In the foregoing embodiment, the division mode is a rectangle division mode or a non-rectangle division mode.

In the foregoing embodiment, if the division mode is a rectangle division mode, the second acquiring module 1202 is specifically configured to acquire a first offset of a division line of the current image block.

The processing module 1503 is specifically configured to perform encoding processing on a rectangle division mode identifier and the first offset.

In the foregoing embodiment, if the division mode is a non-rectangle division mode, the second acquiring module 1202 is specifically configured to acquire a proportion, a division direction, and a second offset that are of a division line of the current image block, where the proportion of the division line is obtained according to coordinate values of two intersection points between the division line and boundaries of the current image block.

The processing module 1503 is specifically configured to: if the division mode is a non-rectangle division mode, perform encoding processing on a non-rectangle division mode identifier, and the proportion, the division direction, and the second offset that are of the division line.

In the foregoing embodiment, the first offset is a zero value or a non-zero value.

If the first offset is a non-zero value, the first offset includes a symbol of the first offset and an absolute value of the first offset.

The processing module 1503 is specifically configured to successively encode the absolute value of the first offset and the symbol of the first offset.

If the first offset is a zero value, the first offset has no symbol, and the processing module 1503 is specifically configured to encode the zero value.

In the foregoing embodiment, the second offset is a zero value or a non-zero value.

If the second offset is a non-zero value, the second offset includes a symbol of the second offset and an absolute value of the second offset.

The processing module 1503 is specifically configured to successively encode the absolute value of the second offset and the symbol of the second offset.

If the second offset is a zero value, the second offset has no symbol bit, and the processing module 1503 is specifically configured to encode the zero value.

In the foregoing embodiment, the processing module 1503 is specifically configured to: if the absolute value of the first offset is greater than a preset value, acquire a first sum of the preset value and a value that is 1/n of a difference between the absolute value of the first offset and the preset value, where n is an integer greater than 1; and successively encode the first sum and the symbol of the first offset.

In the foregoing embodiment, the processing module 1503 is specifically configured to: if the absolute value of the second offset is greater than a preset value, acquire a second sum of the preset value and a value that is 1/n of a difference between the absolute value of the second offset and the preset value, where n is an integer greater than 1; and successively encode the second sum and the symbol of the second offset.

In the foregoing embodiment, the proportion of the division line is a ratio of a difference between vertical coordinates to a difference between horizontal coordinates, where the vertical coordinates and the horizontal coordinates are coordinate values of the two intersection points between the division line and the boundaries of the current image block.

The apparatus in this embodiment may be used to implement the technical solutions in the method embodiment shown in FIG. 1, implementation principles and technical effects in this embodiment are similar to those in the method embodiment, and details are not described herein again.

Figure 15:
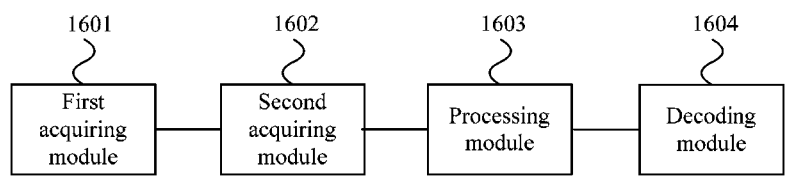
FIG. 15 is a schematic structural diagram of Embodiment 1 of an image decoding apparatus according to the present disclosure.

FIG. 15 is a schematic structural diagram of Embodiment 1 of an image decoding apparatus according to the present disclosure. The apparatus in this embodiment includes: a first acquiring module 1601, a second acquiring module 1602, a processing module 1603, and a decoding module 1604, where the first acquiring module 1601 is configured to acquire a division mode identifier of a to-be-decoded image block; the second acquiring module 1602 is configured to acquire division information of the to-be-decoded image block according to the division mode identifier; the processing module 1603 is configured to determine, according to the division mode identifier and the division information, a partition to which a sample point in the to-be-decoded image block belongs; and the decoding module 1604 is configured to perform decoding processing on the to-be-decoded image block according to the partition to which the sample point belongs.

In the foregoing embodiment, the division mode identifier is a rectangle division mode identifier or a non-rectangle division mode identifier.

In the foregoing embodiment, if the division mode identifier is a rectangle division mode identifier, the second acquiring module 1602 is specifically configured to acquire a first offset of a division line of the to-be-decoded image block.

In the foregoing embodiment, if the division mode identifier is a non-rectangle division mode identifier, the second acquiring module 1602 is specifically configured to acquire a proportion, a division direction, and a second offset that are of a division line of the to-be-decoded image block.

In the foregoing embodiment, the second acquiring module 1602 is specifically configured to: acquire the offset value; if the offset value is a zero value, determine that the first offset is a zero value; and if the offset value is a non-zero value, determine an absolute value of the first offset of the division line according to the offset value, acquire symbol information of the offset, and determine a symbol of the first offset according to the symbol information.

In the foregoing embodiment, the second acquiring module 1602 is specifically configured to: acquire the offset value; if the offset value is a zero value, determine that the second offset is a zero value; and if the offset value is a non-zero value, determine an absolute value of the second offset of the division line according to the offset value, acquire symbol information of the offset, and determine a symbol of the second offset according to the symbol information.

In the foregoing embodiment, the second acquiring module 1602 is specifically configured to determine that the offset value is the absolute value of the first offset.

In the foregoing embodiment, the second acquiring module 1602 is specifically configured to determine that the offset value is the absolute value of the second offset.

In the foregoing embodiment, the second acquiring module 1602 is specifically configured to: determine whether the offset value is greater than a preset value; if yes, determine that a sum of the preset value and a value that is n multiples of a difference between the offset value and the preset value is the absolute value of the first offset; and if not, determine that the offset value is the absolute value of the first offset, where n is an integer greater than 1.

In the foregoing embodiment, the second acquiring module 1602 is specifically configured to: determine whether the offset value is greater than a preset value; if yes, determine that a sum of the preset value and a value that is n multiples of a difference between the offset value and the preset value is the absolute value of the second offset; and if not, determine that the offset value is the absolute value of the second offset, where n is an integer greater than 1.

In the foregoing embodiment, the rectangle division mode identifier is a horizontal rectangle division mode identifier or a vertical rectangle division mode identifier.

In the foregoing embodiment, if the rectangle division mode identifier is a horizontal rectangle division mode identifier, the processing module 1603 is specifically configured to: if coordinate values of the sample point meet a condition:

$$y > b1 - a,$$

where y represents a value of a vertical coordinate of the sample point in the to-be-decoded image block, b1 represents a value of a vertical coordinate of a horizontal first preset reference point, and a represents the first offset, determine that the sample point belongs to a first partition; and if the coordinate values of the sample point do not meet the condition y>b1−a, determine that the sample point belongs to a second partition.

In the foregoing embodiment, if the rectangle division mode identifier is a vertical division mode identifier, the processing module 1603 is specifically configured to: if coordinate values of the sample point meet a condition:

$$x > b2 - a,$$

where x represents a value of a horizontal coordinate of the sample point in the to-be-decoded image block, and b2 represents a value of a horizontal coordinate of a vertical first preset reference point, determine that the sample point belongs to a first partition; and if the coordinate values of the sample point do not meet the condition x>b2−a, determine that the sample point belongs to a second partition.

In the foregoing embodiment, if the division mode identifier is a non-rectangle division mode identifier, the processing module 1603 is specifically configured to determine, according to a relationship between coordinate values of the sample point and the proportion, the division direction, and the second offset that are of the division line, the partition to which the sample point in the to-be-decoded image block belongs.

In the foregoing embodiment, the division direction is a first direction from upper left to lower right, or a second direction from lower left to upper right.

In the foregoing embodiment, if the division direction is the first direction from upper left to lower right, the processing module 1603 is specifically configured to: if the coordinate values of the sample point in the to-be-decoded image block meet the following condition:

$$x - b3 - n \times c < y/r,$$

where (x, y) is the coordinate values of the sample point in the to-be-decoded image block, x represents a value of a horizontal coordinate, y represents a value of a vertical coordinate, b3 represents a value of a horizontal coordinate of a second preset reference point in the first direction, c represents the second offset, r represents the proportion, and n is an integer greater than or equal to 1, determine that the sample point belongs to a first partition; and if the coordinate values of the sample point do not meet the condition x−b3−n×c<y/r, determine that the sample point belongs to a second partition.

In the foregoing embodiment, if the division direction is the second direction from lower left to upper right, the processing module 1603 is specifically configured to: if the coordinate values of the sample point in the to-be-decoded image block meet the following condition:

$$b4 - n \times c - x > y/r,$$

where (x, y) is the coordinate values of the sample point in the to-be-decoded image block, x represents a value of a horizontal coordinate, y represents a value of a vertical coordinate, b4 represents a value of a horizontal coordinate of a second preset reference point in the second direction, c represents the second offset, r represents the proportion, and n is an integer greater than or equal to 1, determine that the sample point belongs to a first partition; and if the coordinate values of the sample point do not meet the condition b4−n×c−x>y/r, determine that the sample point belongs to a second partition.

In the foregoing embodiment, when the proportion is greater than or equal to 1, a value of n is 1; otherwise, n is equal to a reciprocal of the proportion.

In the foregoing embodiment, the proportion is greater than or equal to 1, or the proportion is less than 1.

In the foregoing embodiment, if the proportion is greater than or equal to 1, the processing module 1603 is specifically configured to: if the coordinate values of the sample point in the to-be-decoded image block meet the following condition:

$$x - x3 - c > (y - y3)/r,$$

where (x, y) is the coordinate values of the sample point in the to-be-decoded image block, x represents a value of a horizontal coordinate, y represents a value of a vertical coordinate, (x3, y3) represents coordinate values of a second preset reference point, x3 represents a value of a horizontal coordinate, y3 represents a value of a vertical coordinate, c represents the second offset, and r represents the proportion, determine that the sample point belongs to a first partition; and if the coordinate values of the sample point do not meet the condition x−x3−c>(y−y3)/r, determine that the sample point belongs to a second partition.

In the foregoing embodiment, when $r=2^s$, y/r may be obtained by shifting y rightwards by s bits; and when $r=2^{-s}$, y/r may be obtained by shifting y leftwards by s bits, where s is an integer greater than or equal to 1.

In the foregoing embodiment, when $r2^s$, (y−y3)/r may be obtained by shifting a difference of y−y3 rightwards by s bits; and when $r=2^{-s}$, (y−y3)/r may be obtained by shifting a difference of y−y3 leftwards by s bits, where s is an integer greater than or equal to 1.

In the foregoing embodiment, if the proportion is less than 1, the processing module 1603 is specifically configured to: if the coordinate values of the sample point in the to-be-decoded image block meet the following condition:

$$y4+c-r(x-x4)>y,$$

where (x, y) is the coordinate values of the sample point in the to-be-decoded image block, x represents a value of a horizontal coordinate, y represents a value of a vertical coordinate, (x4, y4) represents coordinate values of a second preset reference point, x4 represents a value of a horizontal coordinate, and y4 represents a value of a vertical coordinate, determine that the sample point belongs to a first partition; and if the coordinate values of the sample point do not meet the condition y4+c−r(x−x4)>y, determine that the sample point belongs to a second partition.

In the foregoing embodiment, the processing module 1603 is specifically configured to: determine, according to the division mode identifier, preset coordinate values of a preset reference point corresponding to an image block size; determine coordinate values of a preset reference point of the to-be-decoded image block according to a size of the to-be-decoded image block and the preset coordinate values of the preset reference point corresponding to the image block size; and determine, according to the coordinate values of the preset reference point of the to-be-decoded image block and the division information, the partition to which the sample point in the to-be-decoded image block belongs.

In the foregoing embodiment, the processing module 1603 is specifically configured to: determine coordinate values of two intersection points between a division line and boundaries of the to-be-decoded image block according to the division mode identifier and the division information; and determine, according to the coordinate values of the two intersection points and coordinate values of the sample point in the to-be-decoded image block, the partition to which the sample point in the to-be-decoded image block belongs.

In the foregoing embodiment, the decoding module 1604 is specifically configured to: determine a division template of the to-be-decoded image block according to the partition to which the sample point belongs; and perform decoding processing on the to-be-decoded image block according to the division template.

In the foregoing embodiment, the decoding module 1604 is specifically configured to: if the sample point belongs to a first partition of the division template, perform decoding on the sample point by using a predicted value corresponding to the first partition; and if the sample point belongs to a second partition of the division template, perform decoding on the sample point by using a predicted value corresponding to the second partition.

The apparatus in this embodiment may be used to implement the technical solutions in the method embodiment shown in FIG. 4, implementation principles and technical effects thereof are similar, and details are not described herein again.

Figure 16:
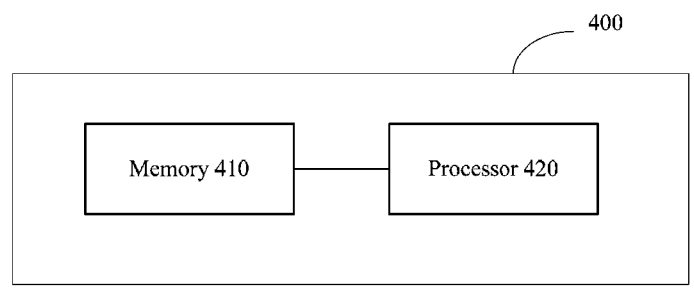
FIG. 16 is a schematic block diagram of an image decoding device according to another embodiment of the present disclosure.

FIG. 16 is a schematic block diagram of an image decoding device according to another embodiment of the present disclosure. An example of a device 400 in FIG. 16 is a decoder. The device 400 includes a memory 410 and a processor 420, where the memory 410 may include a random access memory, a flash memory, a read-only memory, a programmable read-only memory, a non-volatile memory, a register, or the like; and the processor 420 may be a central processing unit (Central Processing Unit, CPU). The memory 410 is configured to store an executable instruction. The processor 420 may execute the executable instruction stored in the memory 410. For example, the processor 420 may be configured to: acquire a division mode identifier of a to-be-decoded image block; acquire division information of the to-be-decoded image block according to the division mode identifier; determine, according to the division mode identifier and the division information, a partition to which a sample point in the to-be-decoded image block belongs; and perform decoding processing on the to-be-decoded image block according to the partition to which the sample point belongs.

Optionally, as an implementation manner, if the division mode identifier is a rectangle division mode identifier, the processor 420 may be configured to acquire a first offset of a division line of the to-be-decoded image block.

Optionally, as another embodiment, if the division mode identifier is a non-rectangle division mode identifier, the processor 420 may be configured to acquire a proportion, a division direction, and a second offset that are of a division line of the to-be-decoded image block.

Optionally, as another embodiment, if the division direction is a first direction from upper left to lower right, the processor 420 may be configured to: the determining, according to a relationship between coordinate values of the sample point and the proportion, the division direction, and the second offset that are of the division line, the partition to which the sample point in the to-be-decoded image block belongs includes:

if the coordinate values of the sample point in the to-be-decoded image block meet the following condition:

$$x-b3-n\times c<y/r,$$

where (x, y) is the coordinate values of the sample point in the to-be-decoded image block, x represents a value of a horizontal coordinate, y represents a value of a vertical coordinate, b3 represents a value of a horizontal coordinate of a second preset reference point in the first direction, c represents the second offset, r represents the proportion, and n is an integer greater than or equal to 1, determine that the sample point belongs to a first partition; and if the coordinate values of the sample point do not meet the condition x−b3−n×c<y/r, determine that the sample point belongs to a second partition.

Optionally, as another embodiment, if the division direction is a second direction from lower left to upper right, the processor 420 may be configured to: the determining, according to a relationship between coordinate values of the sample point and the proportion, the division direction, and the second offset that are of the division line, the partition to which the sample point in the to-be-decoded image block belongs includes:

if the coordinate values of the sample point in the to-be-decoded image block meet the following condition:

$$b4-n\times c-x>y/r,$$

where (x, y) is the coordinate values of the sample point in the to-be-decoded image block, x represents a value of a horizontal coordinate, y represents a value of a vertical coordinate, b4 represents a value of a horizontal coordinate of a second preset reference point in the second direction, c represents the second offset, r represents the proportion, and n is an integer greater than or equal to 1, determine that the sample point belongs to a first partition; and if the coordinate values of the sample point do not meet the condition b4−n×c−x>y/r, determine that the sample point belongs to a second partition.

For other functions and operations of the device 400 in FIG. 16, reference may be made to the process of the foregoing method embodiment shown in FIG. 4. To avoid repetition, details are not described herein again.

Persons of ordinary skill in the art may understand that all or some of the steps of the method embodiments may be implemented by a program instructing relevant hardware. The foregoing program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An image encoding method, comprising:
   acquiring, by a processor included in a device for encoding an image, a division mode used for a current image block;
   acquiring, by the processor, division information of the current image block according to the division mode, wherein the division mode is a rectangle division mode or a non-rectangle division mode; and
   performing by the processor, encoding processing based on a division mode identifier and the division information that correspond to the division mode;
   wherein in response to determining that the division mode is the rectangle division mode,
      the acquiring the division information comprises: acquiring a first offset of a division line of the current image block, and
      the performing the encoding processing comprises: performing encoding processing based on a rectangle division mode identifier and the first offset; and
   wherein in response to determining that the division mode is the non-rectangle division mode,
      the acquiring the division information comprises: acquiring a proportion, a division direction, and a second offset that are of a division line of the current image block, wherein the proportion of the division line is obtained according to coordinate values of two intersection points between the division line and boundaries of the current image block; and
      the performing the encoding processing comprises: performing encoding processing based on a non-rectangle division mode identifier, the proportion, the division direction, and the second offset that are of the division line.

2. The method according to claim 1, wherein the first offset is a zero value or a non-zero value;
   if the first offset is a non-zero value, then:
      the first offset comprises a symbol of the first offset and an absolute value of the first offset, and
      performing the encoding processing based on the first offset comprises successively encoding the absolute value of the first offset and the symbol of the first offset; and
   if the first offset is a zero value, then:
      the first offset has no symbol, and
      performing the encoding processing based on the first offset comprises encoding the zero value.

3. The method according to claim 2, wherein successively encoding the absolute value of the first offset and the symbol of the first offset comprises:
   if the absolute value of the first offset is greater than a preset value, acquiring a first sum of the preset value and a value that is 1/n of a difference between the absolute value of the first offset and the preset value, wherein n is an integer greater than 1; and
   successively encoding the first sum and the symbol of the first offset.

4. The method according to claim 1, wherein the second offset is a zero value or a non-zero value;
   if the second offset is a non-zero value, then:
      the second offset comprises a symbol of the second offset and an absolute value of the second offset, and
      performing the encoding processing based on the second offset comprises successively encoding the absolute value of the second offset and the symbol of the second offset; and
   if the second offset is a zero value, then:
      the second offset has no symbol, and
      performing the encoding processing based on the second offset comprises encoding the zero value.

5. The method according to claim 4, wherein successively encoding the absolute value of the second offset and the symbol of the second offset comprises:
   if the absolute value of the second offset is greater than a preset value, acquiring a second sum of the preset value and a value that is 1/n of a difference between the absolute value of the second offset and the preset value, wherein n is an integer greater than 1; and
   successively encoding the second sum and the symbol of the second offset.

6. The method according to claim 1, wherein the proportion of the division line is a ratio of a difference between vertical coordinates to a difference between horizontal coordinates, wherein the vertical coordinates and the horizontal coordinates are coordinate values of the two intersection points between the division line and the boundaries of the current image block.

7. An image decoding method, comprising:
   acquiring, by a processor included in a device for decoding an image, a division mode identifier of a to-be-decoded image block;
   acquiring, by the processor, division information of the to-be-decoded image block according to the division mode identifier, wherein the division mode identifier is a rectangle division mode identifier or a non-rectangle division mode identifier;
   determining by the processor and according to the division mode identifier and the division information, a partition to which a sample point in the to-be-decoded image block belongs; and
   performing by the processor, decoding processing based on the to-be-decoded image block according to the partition to which the sample point belongs;
   wherein in response to determining that the division mode identifier is the rectangle division mode identifier, the acquiring the division information of the to-be-decoded image block according to the division mode identifier comprises: acquiring a first offset of a division line of the to-be-decoded image block; and wherein in response to determining that the division mode identifier is the non-rectangle division mode identifier, the acquiring the division information of the to-be-decoded image block according to the division mode identifier comprises: acquiring a proportion, a division direction, and a second offset that are of a division line of the to-be-decoded image block.

8. The method according to claim 7, wherein acquiring the first offset of the division line of the to-be-decoded image block comprises:

acquiring an offset value, and if the offset value is a zero value, determining that the first offset is a zero value; and if the offset value is a non-zero value, determining an absolute value of the first offset of the division line according to the offset value, acquiring symbol information of the first offset, and determining a symbol of the first offset according to the symbol information.

9. The method according to claim 8, wherein determining the absolute value of the first offset of the division line according to the offset value comprises:

determining that the offset value is the absolute value of the first offset.

10. The method according to claim 8, wherein determining the absolute value of the first offset of the division line according to the offset value comprises:

determining whether the offset value is greater than a preset value;

in response to determining that the offset value is greater than the preset value, determining that a sum of the preset value and a value that is n multiples of a difference between the offset value and the preset value is the absolute value of the first offset; and in response to determining that the offset value is not greater than the preset value, determining that the offset value is the absolute value of the first offset, wherein n is an integer greater than 1.

11. The method according to claim 7, wherein acquiring the second offset of the division line of the to-be-decoded image block comprises:

acquiring the offset value, and if the offset value is a zero value, determining that the second offset is a zero value; and if the offset value is a non-zero value, determining an absolute value of the second offset of the division line according to the offset value, acquiring symbol information of the second offset, and determining a symbol of the second offset according to the symbol information.

12. The method according to claim 11, wherein determining the absolute value of the second offset of the division line according to the offset value comprises:

determining that the offset value is the absolute value of the second offset.

13. The method according to claim 11, wherein determining the absolute value of the second offset of the division line according to the offset value comprises:

determining whether the offset value is greater than a preset value;

in response to determining that the offset value is greater than the preset value, determining that a sum of the preset value and a value that is n multiples of a difference between the offset value and the preset value is the absolute value of the second offset; and in response to determining that the offset value is not greater than the preset value, determining that the offset value is the absolute value of the second offset, wherein n is an integer greater than 1.

14. The method according to claim 7, wherein the rectangle division mode identifier is a horizontal rectangle division mode identifier or a vertical rectangle division mode identifier.

15. The method according to claim 14, wherein the rectangle division mode identifier is a horizontal rectangle division mode identifier, and the determining, according to the division mode identifier and the division information, the partition to which the sample point in the to-be-decoded image block belongs comprises:

if coordinate values of the sample point meet a condition: $y > b1 - a$, wherein y represents a value of a vertical coordinate of the sample point in the to-be-decoded image block, b1 represents a value of a vertical coordinate of a horizontal first preset reference point, and a represents the first offset, then determining that the sample point belongs to a first partition; and if the coordinate values of the sample point do not meet the condition $y > b1 - a$, then determining that the sample point belongs to a second partition.

16. The method according to claim 14, wherein the rectangle division mode identifier is a vertical rectangle division mode identifier, and the determining, according to the division mode identifier and the division information, the partition to which the sample point in the to-be-decoded image block belongs comprises:

if coordinate values of the sample point meet a condition:

$$x > b2 - a,$$

wherein x represents a value of a horizontal coordinate of the sample point in the to-be-decoded image block, and b2 represents a value of a horizontal coordinate of a vertical first preset reference point, then determining that the sample point belongs to a first partition; and if the coordinate values of the sample point do not meet the condition $x > b2 - a$, then determining that the sample point belongs to a second partition.

17. The method according to claim 7, wherein the division mode identifier is a non-rectangle division mode identifier, and the determining, according to the division mode identifier and the division information, the partition to which the sample point in the to-be-decoded image block belongs comprises:

determining, according to a relationship between coordinate values of the sample point and the proportion, the division direction, and the second offset that are of the division line, the partition to which the sample point in the to-be-decoded image block belongs.

18. The method according to claim 17, wherein the division direction is a first direction from upper left to lower right, or a second direction from lower left to upper right.

19. The method according to claim 18, wherein the division direction is the first direction from upper left to lower right, and the determining, according to the relationship between coordinate values of the sample point and the proportion, the division direction, and the second offset that are of the division line, the partition to which the sample point in the to-be-decoded image block belongs comprises:

if the coordinate values of the sample point in the to-be-decoded image block meet the following condition:

$$x - b3 - n \times c \leq y/r,$$

wherein
- (x, y) is the coordinate values of the sample point in the to-be-decoded image block, x represents a value of a horizontal coordinate, y represents a value of a vertical coordinate, b3 represents a value of a horizontal coordinate of a second preset reference point in the first direction, c represents the second offset, r represents the proportion, and n is an integer greater than or equal to 1, then determining that the sample point belongs to a first partition; and
- if the coordinate values of the sample point do not meet the condition x−b3−n×c<y/r, then determining that the sample point belongs to a second partition.

20. The method according to claim 19, wherein:
- if the proportion is greater than or equal to 1, then a value of n is 1; and
- if the proportion is not greater than or equal to 1, then n is equal to a reciprocal of the proportion.

21. The method according to claim 20, wherein the proportion is greater than or equal to 1, or the proportion is less than 1.

22. The method according to claim 21, wherein the proportion is greater than or equal to 1, and the determining, according to the relationship between coordinate values of the sample point and the proportion, the division direction, and the second offset that are of the division line, the partition to which the sample point in the to-be-decoded image block belongs comprises:
- if the coordinate values of the sample point in the to-be-decoded image block meet the following condition:

$x-x3-c>(y-y3)/r,$ wherein
- (x, y) is the coordinate values of the sample point in the to-be-decoded image block, x represents a value of a horizontal coordinate, y represents a value of a vertical coordinate, (x3, y3) represents coordinate values of a second preset reference point, x3 represents a value of a horizontal coordinate, y3 represents a value of a vertical coordinate, c represents the second offset, and r represents the proportion, then determining that the sample point belongs to a first partition; and
- if the coordinate values of the sample point do not meet the condition x−x3−c>(y−y3)/r, then determining that the sample point belongs to a second partition.

23. The method according to claim 22, wherein:
- if r=2$^s$, then (y−y3)/r is obtained by shifting a value of y−y3 rightwards by s bits; and
- if r=2$^{-s}$, then (y−y3)/r is obtained by shifting a difference of y−y3 leftwards by s bits,
wherein s is an integer greater than or equal to 1.

24. The method according to claim 19, wherein:
- if r=2$^s$, then y/r is obtained by shifting y rightwards by s bits; and
- if r=$^{-2}$, then y/r is obtained by shifting y leftwards by s bits,
wherein s is an integer greater than or equal to 1.

25. The method according to claim 21, wherein the proportion is less than 1, and the determining, according to the relationship between coordinate values of the sample point and the proportion, the division direction, and the second offset that are of the division line, the partition to which the sample point in the to-be-decoded image block belongs comprises:
- if the coordinate values of the sample point in the to-be-decoded image block meet the following condition:

$y4+c-r(x-x4)>y,$ wherein
- (x, y) is the coordinate values of the sample point in the to-be-decoded image block, x represents a value of a horizontal coordinate, y represents a value of a vertical coordinate, (x4, y4) represents coordinate values of a second preset reference point, x4 represents a value of a horizontal coordinate, and y4 represents a value of a vertical coordinate, then determining that the sample point belongs to a first partition; and
- if the coordinate values of the sample point do not meet the condition y4+c−r(x−x4)>y, then determining that the sample point belongs to a second partition.

26. The method according to claim 18, wherein the division direction is the second direction from lower left to upper right, and the determining, according to the relationship between coordinate values of the sample point and the proportion, the division direction, and the second offset that are of the division line, the partition to which the sample point in the to-be-decoded image block belongs comprises:
- if the coordinate values of the sample point in the to-be-decoded image block meet the following condition:

$b4-n\times c-x>y/r,$ wherein
- (x, y) is the coordinate values of the sample point in the to-be-decoded image block, x represents a value of a horizontal coordinate, y represents a value of a vertical coordinate, b4 represents a value of a horizontal coordinate of a second preset reference point in the second direction, c represents the second offset, r represents the proportion, and n is an integer greater than or equal to 1, then determining that the sample point belongs to a first partition; and
- if the coordinate values of the sample point do not meet the condition b4−n×c−x>y/r, then determining that the sample point belongs to a second partition.

27. The method according to claim 7, wherein the determining, according to the division mode identifier and the division information, the partition to which the sample point in the to-be-decoded image block belongs comprises:
- determining, according to the division mode identifier, preset coordinate values of a preset reference point corresponding to an image block size;
- determining coordinate values of a preset reference point of the to-be-decoded image block according to a size of the to-be-decoded image block and the preset coordinate values of the preset reference point corresponding to the image block size; and
- determining, according to the coordinate values of the preset reference point of the to-be-decoded image block and the division information, the partition to which the sample point in the to-be-decoded image block belongs.

28. The method according to claim 7, wherein determining, according to the division mode identifier and the division information, the partition to which the sample point in the to-be-decoded image block belongs comprises:
- determining coordinate values of two intersection points between a division line and boundaries of the to-be-decoded image block according to the division mode identifier and the division information; and
- determining, according to the coordinate values of the two intersection points and coordinate values of the sample point in the to-be-decoded image block, the partition to which the sample point in the to-be-decoded image block belongs.

29. The method according to claim 7, wherein performing the decoding processing based on the to-be-decoded image block according to the partition to which the sample point belongs comprises:
  determining a division template of the to-be-decoded image block according to the partition to which the sample point belongs; and
  performing decoding processing based on the to-be-decoded image block according to the division template.

30. The method according to claim 29, wherein performing the decoding processing based on the to-be-decoded image block according to the division template comprises:
  if the sample point belongs to a first partition of the division template, then performing decoding on the sample point by using a predicted value corresponding to the first partition; and
  if the sample point belongs to a second partition of the division template, then performing decoding on the sample point by using a predicted value corresponding to the second partition.

31. A device for encoding an image comprising:
  a memory storing executable instructions; and
  a processor configured to execute the executable instructions to cause the device to:
    acquire a division mode used for a current image block;
    acquire division information of the current image block according to the division mode; and
    perform encoding processing based on a division mode identifier and the division information that correspond to the division mode;
  wherein in response to determining that the division mode is the rectangle division mode,
    the acquiring the division information comprises: acquiring a first offset of a division line of the current image block, and
    the performing the encoding processing comprises: performing encoding processing based on a rectangle division mode identifier and the first offset; and
  wherein in response to determining that the division mode is the non-rectangle division mode,
    the acquiring the division information comprises: acquiring a proportion, a division direction, and a second offset that are of a division line of the current image block, wherein the proportion of the division line is obtained according to coordinate values of two intersection points between the division line and boundaries of the current image block; and
    the performing the encoding processing comprises: performing encoding processing based on a non-rectangle division mode identifier, the proportion, the division direction, and the second offset that are of the division line.

32. A device for decoding an image comprising:
  a memory storing executable instructions; and
  a processor configured to execute the executable instructions to cause the device to:
    acquire a division mode identifier of a to-be-decoded image block;
    acquire division information of the to-be-decoded image block according to the division mode identifier, wherein the division mode identifier is a rectangle division mode identifier or a non-rectangle division mode identifier;
    determine, according to the division mode identifier and the division information, a partition to which a sample point in the to-be-decoded image block belongs; and
  perform decoding processing based on the to-be-decoded image block according to the partition to which the sample point belongs;
    wherein in response to determining that the division mode identifier is the rectangle division mode identifier, the acquiring the division information of the to-be-decoded image block according to the division mode identifier comprises: acquiring a first offset of a division line of the to-be-decoded image block; and
    wherein in response to determining that the division mode identifier is the non-rectangle division mode identifier, the acquiring the division information of the to-be-decoded image block according to the division mode identifier comprises: acquiring a proportion, a division direction, and a second offset that are of a division line of the to-be-decoded image block.

* * * * *